(12) United States Patent
Hu et al.

(10) Patent No.: US 12,452,010 B2
(45) Date of Patent: Oct. 21, 2025

(54) PILOT TONE DESIGN FOR DISTRIBUTED-TONE RESOURCE UNITS IN 6GHz LOW-POWER INDOOR SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 359 days.

(21) Appl. No.: 17/670,491

(22) Filed: Feb. 13, 2022

(65) Prior Publication Data
US 2022/0263624 A1      Aug. 18, 2022

Related U.S. Application Data

(60) Provisional application No. 63/232,699, filed on Aug. 13, 2021, provisional application No. 63/231,809, filed on Aug. 11, 2021, provisional application No. 63/150,154, filed on Feb. 17, 2021.

(51) Int. Cl.
*H04L 5/00* (2006.01)
*H04L 25/02* (2006.01)
*H04L 27/26* (2006.01)

(52) U.S. Cl.
CPC ........ *H04L 5/0048* (2013.01); *H04L 25/0224* (2013.01); *H04L 27/2613* (2013.01)

(58) Field of Classification Search
CPC .............. H04L 5/0048; H04L 25/0224; H04L 27/2613; H04L 5/0066; H04L 5/003; H04L 5/0007; H04L 5/0064; H04W 4/33
See application file for complete search history.

(56) References Cited

U.S. PATENT DOCUMENTS

| | | |
|---|---|---|
| 2010/0284482 A1 | 11/2010 | Cudak et al. |
| 2012/0088515 A1 | 4/2012 | Choi et al. |
| 2016/0088600 A1* | 3/2016 | Yang ...................... H04W 72/04 370/329 |
| 2016/0226638 A1 | 8/2016 | Azizi et al. |

(Continued)

FOREIGN PATENT DOCUMENTS

| | | |
|---|---|---|
| CN | 106717097 A | 5/2017 |
| CN | 107113132 A | 8/2017 |

(Continued)

OTHER PUBLICATIONS

European Patent Office, European Search Report for European Patent Application No. 21205530.5, Mar. 30, 2022.

(Continued)

*Primary Examiner* — Steven Hieu D Nguyen
(74) *Attorney, Agent, or Firm* — Andy M. Han; Han IP PLLC

(57) ABSTRACT

Various schemes pertaining to pilot tone design for distributed-tone resource units (dRUs) in 6 GHz low-power indoor (LPI) systems are described. A communication entity generates a plurality of pilot tones of a dRU based on a hierarchical structure of pilot tones that is used for a regular RU (rRU). The communication entity then communicates with another communication entity using the dRU.

12 Claims, 45 Drawing Sheets

(56) References Cited

U.S. PATENT DOCUMENTS

| | | | |
|---|---|---|---|
| 2017/0310424 A1* | 10/2017 | Chun | H04L 1/0075 |
| 2018/0323837 A1* | 11/2018 | Park | H04L 25/02 |
| 2019/0110261 A1 | 4/2019 | Chen et al. | |
| 2020/0014509 A1 | 1/2020 | Asterjadhi et al. | |
| 2020/0281027 A1 | 9/2020 | Damnjanovic et al. | |
| 2021/0143955 A1* | 5/2021 | Yang | H04L 5/003 |
| 2021/0160889 A1* | 5/2021 | Yang | H04L 27/261 |
| 2023/0048884 A1* | 2/2023 | Yang | H04L 5/0041 |
| 2023/0104295 A1* | 4/2023 | Yang | H04L 27/2613 370/329 |

FOREIGN PATENT DOCUMENTS

| | | |
|---|---|---|
| CN | 107113140 A | 8/2017 |
| CN | 108781145 A | 11/2018 |
| TW | 200947992 A | 11/2009 |
| TW | 202025847 A | 7/2020 |
| WO | WO 2016137144 A1 | 9/2016 |

OTHER PUBLICATIONS

Edward AU (Huawei), "Specification Framework for TGbe", IEEE Draft, 11-19-1262-14-00BE-Specification-Framework-For-TGBE, IEEE-SA Mentor, Piscataway, NJ, USA, vol. 802.11 EHT; 802.11be, No. 14, Sep. 5, 2020, pp. 1-58, XP068172484.

Shahrnaz Azizi (Intel Corporation), "OFDMA Numerology and Structure; 11-15-0330-05-00ax-ofdma-numerology-and-structure", IEEE Draft, 11-15-0330-05-00AX-OFDMA-Numerology-and-Structure, IEEE-SA Mentor, Piscataway, NJ, USA, vol. 802.11ax, No. 5, May 14, 2015, pp. 1-50, XP068094351.

Chenchen Liu (Huawei), "Discussions on PAPR Reduction Methods for DUP Mode", IEEE Draft, 11-20-1206-01-00BE-Discussions-on-PAPR-Reduction-Methods-for-DUP-Mode, IEEE-SA Mentor, Piscataway, NJ, USA, vol. 802.11 EHT, 802.11be, Sep. 28, 2020, pp. 1-14, XP068173626.

European Patent Office, European Search Report for European Patent Application No. 22156849.6, Jul. 25, 2022.

Jinyoung Chun (LGE): "Pilot subcarriers for new tone plan"; IEEE Draft; 11-20-0838-03-00BE-Pilot-Subcarriers-for-New-Tone-Plan; IEEE-SA Mentor; Piscataway, NJ, USA; vol. 802.11 EHT; 802.11be, No. 3; Jun. 22, 2020; pp. 1-16.

China National Intellectual Property Administration, First Office Action in China Patent Application No. 202210141677.1, Apr. 22, 2023.

Taiwan Intellectual Property Office, Office Action for Taiwan Patent Application No. 110140408, Nov. 23, 2022.

Taiwan Intellectual Property Office, Office Action for Taiwan Patent Application No. 111105346, Aug. 29, 2022.

China National Intellectual Property Administration, First Office Action in China Patent Application No. 202111274384.2, Dec. 15, 2023.

* cited by examiner

Pilot Indices for Transmission of a 26-tone dRU

| PPDU BW | $K_{dRU26_i}$ |
|---|---|
| 20MHz, i=1:9 | {-68 68}, {-64 64}, {-66 66}, {-62 62}, {-60 60}, {-67 67}, {-63 63}, {-65 65}, {-61 61} |
| 40MHz, i=1:18 | {-136 136}, {-127 127}, {-132 132}, {-123 123}, {-128 128}, {-134 134}, {-125 125}, {-130 130}, {-121 121}, {-135 135}, {-126 126}, {-131 131}, {-122 122}, {-119 119}, {-133 133}, {-124 124}, {-129 129}, {-120 120} |
| 80MHz, i=1:36 | {-278 278}, {-262 262}, {-270 270}, {-254 254}, {-246 246}, {-274 274}, {-258 258}, {-266 266}, {-250 250}, {-272 272}, {-256 256}, {-264 264}, {-248 248}, {-244 244}, {-276 276}, {-260 260}, {-268 268}, {-252 252}, {-277 277}, {-261 261}, {-269 269}, {-253 253}, {-245 245}, {-273 273}, {-257 257}, {-265 265}, {-249 249}, {-271 271}, {-255 255}, {-263 263}, {-247 247}, {-243 243}, {-275 275}, {-259 259}, {-267 267}, {-251 251} |

FIG. 3

Pilot Indices for Transmission of a 52-tone dRU

| PPDU BW | $K_{dRU52_i}$ |
|---|---|
| 20MHz, i=1:4 | {-95 -37 37 95}, {-93 -35 35 93}, {-94 -36 36 94}, {-92 -34 34 92} |
| 40MHz, i=1:8 | {-190 -73 73 190}, {-186 -69 69 186}, {-381 -143 143 381}, {-184 -67 67 184},<br>{-189 -72 72 189}, {-185 -68 68 185}, {-187 -70 70 187}, {-183 -66 66 183} |
| 80MHz, i=1:16 | {-389 -151 151 389}, {-381 -143 143 381}, {-385 -147 147 385}, {-377 -139 139 377},<br>{-383 -145 145 383}, {-375 -137 137 375}, {-387 -149 149 387}, {-379 -141 141 379},<br>{-388 -150 150 388}, {-380 -142 142 380}, {-384 -146 146 384}, {-376 -138 138 376},<br>{-382 -144 144 382}, {-374 -136 136 374}, {-386 -148 148 386}, {-378 -140 140 378} |

Pilot Indices for Transmission of a 106-tone dRU

| PPDU BW | $K_{dRU106_i}$ |
|---|---|
| 20MHz, i=1:2 | {-109 -50 50 109}, {-108 -49 49 108} |
| 40MHz, i=1:4 | {-217 -100 100 217}, {-215 -98 98 215}, {-216 -99 99 216}, {-214 -97 97 214}, |
| 80MHz, i=1:8 | {-447 -204 204 447}, {-443 -200 200 443}, {-441 -198 198 441}, {-445 -202 202 445}, {-446 -203 203 446}, {-442 -199 199 442}, {-440 -197 197 440}, {-444 -201 201 444}, |

FIG. 7

Pilot Indices for Transmission of a 242-tone dRU

| PPDU BW | K dRU242$_i$ |
|---|---|
| 40MHz, i=1:2 | {−233 −181 −98 −46 46 98 181 233}, {−230 −178 −97 −45 45 97 178 230}, |
| 80MHz, i=1:4 | {−476 −369 −200 −93 93 200 369 476}, {−474 −367 −198 −91 91 198 367 474}, {−475 −368 −199 −92 92 199 368 475}, {−473 −366 −197 −90 90 197 366 473}, |

FIG. 8

Pilot values for dRU with 2 pilot tones:

| $\Psi_0$ | $\Psi_1$ |
|---|---|
| 1 | -1 |

Pilot values for dRU with 4 pilot tones:

| $\Psi_0$ | $\Psi_1$ | $\Psi_2$ | $\Psi_3$ |
|---|---|---|---|
| 1 | 1 | 1 | -1 |

Pilot values for dRU with 8 pilot tones:

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | -1 | -1 | 1 | 1 | 1 |

Pilot values for dMRU with 6 pilot tones (e.g., dMRU(26+52) and dMRU(26+106)):

$\Psi_0 = 1, \Psi_1 = 1, \Psi_2 = 1, \Psi_3 = -1, \Psi_4 = -1, \Psi_5 = 1$

FIG. 11

Pilot mappings for 26-tone dRU with 2 pilot tones:

$$K_{dR26_i}$$
$$P_n = \{\Psi_{n \bmod 2}, \Psi_{(n+1) \bmod 2}\}$$
$$k \notin K_{dR26_i}$$
$$P_n = 0$$

Pilot mappings for 52-tone dRU with 4 pilot tones:

$$K_{dR52_i}$$
$$P_n = \{\Psi_{n \bmod 4}, \Psi_{(n+1) \bmod 4}, \Psi_{(n+2) \bmod 4}, \Psi_{(n+3) \bmod 4}\}$$
$$k \notin K_{dR52_i}$$
$$P_n = 0$$

Pilot mappings for 106-tone dRU with 4 pilot tones:

$$P_n^{K_{dR106_i}} = \{\Psi_{n \bmod 4}, \Psi_{(n+1) \bmod 4}, \Psi_{(n+2) \bmod 4}, \Psi_{(n+3) \bmod 4}\}$$

$$P_n^{k \notin K_{dR106_i}} = 0$$

Pilot mappings for 242-tone dRU with 8 pilot tones:

$$P_n^{K_{dR242_i}} = \{\Psi_{n \bmod 8}, \Psi_{(n+1) \bmod 8}, \Psi_{(n+2) \bmod 8}, \Psi_{(n+3) \bmod 8},$$
$$\Psi_{(n+4) \bmod 8}, \Psi_{(n+5) \bmod 8}, \Psi_{(n+6) \bmod 8}, \Psi_{(n+7) \bmod 8}\}$$

$$P_n^{k \notin K_{dR242_i}} = 0$$

FIG. 13

Pilot mappings for 484-tone dRU with 16 pilot tones:

$$P_n^{K_{dR484_i}} = \{\Psi_{n \bmod 8}, \Psi_{(n+1) \bmod 8}, \Psi_{(n+2) \bmod 8}, \Psi_{(n+3) \bmod 8},$$
$$\Psi_{(n+4) \bmod 8}, \Psi_{(n+5) \bmod 8}, \Psi_{(n+6) \bmod 8}, \Psi_{(n+7) \bmod 8},$$
$$\Psi_{(n+8) \bmod 8}, \Psi_{(n+9) \bmod 8}, \Psi_{(n+10) \bmod 8}, \Psi_{(n+11) \bmod 8},$$
$$\Psi_{(n+12) \bmod 8}, \Psi_{(n+13) \bmod 8}, \Psi_{(n+14) \bmod 8}, \Psi_{(n+15) \bmod 8}\}$$

$$k \notin K_{dR484_i}$$
$$P_n^k = 0$$

Pilot mappings for (26+52)-tone dMRU and (26+106)-tone dMRU with 6 pilot tones:

$P_n^{K_{dR26+52_i}} = \{ \Psi_{n \bmod 6}, \Psi_{(n+1) \bmod 6}, \Psi_{(n+2) \bmod 6}, \Psi_{(n+3) \bmod 6}, \Psi_{(n+4) \bmod 6}, \Psi_{(n+5) \bmod 6} \}$ $P_n^{k \notin K_{dR26+52_i}} = 0$ $P_n^{K_{dR26+106_i}} = \{ \Psi_{n \bmod 6}, \Psi_{(n+1) \bmod 6}, \Psi_{(n+2) \bmod 6}, \Psi_{(n+3) \bmod 6}, \Psi_{(n+4) \bmod 6}, \Psi_{(n+5) \bmod 6} \}$ $P_n^{k \notin K_{dR26+106_i}} = 0$

FIG. 15

2500 — Pilot Indices for Transmission of a 26-tone dRU

| PPDU BW | KdRU26$_i$ |
|---|---|
| 20MHz, i=1:9 | {-111,15}, {-62,64},{-37,89}, {-87,39}, {-13,113}, {-74,52}, {-25,101}, {-99,27}, {-50,76} |
| 40MHz, i=1:18 | {-224,28}, {-107,145},{-58,194},{-175,77}, {-117,135}, {-150,102}, {-33,219}, {-200,52},{-83,169}, {-187,65}, {-70,182},{-21,231}, {-138,114}, {-126,126}, {-95,157},{-212,40}, {-163, 89}, {-46,206} |
| 80MHz, i=1:36 | {-411,89}, {-143,357},{-115,385}, {-171,329}, {-253,237}, {-319,181}, {-291,209},{-347,153}, {-189,311}, {-245,255},{-217,283}, {-273,227}, {-125,375}, {-337,163},{-393,107}, {-365, 135}, {-97,403}, {-374,126},{-106,394},{-402,98}, {-134,366}], {-162,338}, {-226,274}, {-282,218},{-254,246},{-310,190}, {-152,348}, {-208,292},{-180,320}, {-236,264}, {-88,412},{-300,200},{-356,144}, {-328, 172}, {-384,116} |

Pilot Indices for Transmission of a 52-tone dRU

| PPDU BW | KdRU52$_i$ |
|---|---|
| 20MHz, i=1:4 | {-111 -62 15 64}, {-87 -37 39 89}, {-74 -25 52 101}, {-99 -50 27 76} |
| 40MHz, i=1:8 | {-224 -107 28 145}, {-175 -58 77 194},{-150 -33 102 219}, {-200 -83 52 169}, {-187 -70 65 182}, {-138 -21 114 231}, {-212 -95 40 157}, {-163 -46 89 206} |
| 80MHz, i=1:16 | {-411 -143 89 357}, {-171 -115 329 385},{-319 -263 181 237},{-347 -291 153 209}, {-245 -189 255 311},{-273 -217 227 283},{-393 -337 107 163},{-365 -97 135 403}, {-374 -106 126 394},{-402 -134 98 366},{-282 -226 218 274},{-310 -254 190 246}, {-208 -152 292 348},{-236 -180 264 320},{-356 -300 144 200},{-384 -328 116 172} |

FIG. 25

Pilot Indices for Transmission of a 106-tone dRU

| PPDU BW | KdRU106$_i$ |
|---|---|
| 20MHz, i=1:2 | {-111 -87 15 39}, {-25 -50 101 76} |
| 40MHz, i=1:4 | {-224 -107 28 145}, {-200 -83 52 169}, {-138 -21 114 231}, {-163 -46 89 206} |
| 80MHz, i=1:8 | {-411 -171 89 329}, {-319 -263 181 237}, {-245 -189 255 311}, {-393 -337 107 163}, {-374 -134 126 366}, {-282 -226 218 274}, {-208 -152 292 348}, {-356 -300 144 200} |

Pilot Indices for Transmission of a 242-tone dRU

| PPDU BW | KdRU242$_i$ |
|---|---|
| 40MHz, i=1:2 | {-224 -200 -107 -83 28 52 145 169}, {-163 -138 -46 -21 89 114 206 231} |
| 80MHz, i=1:4 | {-411 -319 -263 -171 89 181 237 329}, {-393 -337 -245 -189 107 163 255 311}, {-374 -282 -226 -134 126 218 274 366}, {-356 -300 -208 -152 144 200 292 348} |

Pilot Indices for Transmission of a 484-tone dRU

| PPDU BW | KdRU484$_i$ |
|---|---|
| 80MHz, i=1:2 | {-411 -393 -337 -319 -263 -245 -189 -171 89 107 163 181 237 255 311 329}, {-374 -356 -300 -282 -226 -208 -152 -134 126 144 200 218 274 292 348 366} |

Pilot Indices for Transmission of a 26-tone dRU

| PPDU BW | $K_{dRU26_i}$ |
|---|---|
| 20MHz, i=1:9 | {-111  15},{-89  37},{-100  26},{-78  48},{-67  59},{-56  70},{-34  92},{-45  81},{-23  103} |
| 40MHz, i=1:18 | {-224  28},{-125  127},{-202  50},{-103  149},{-81  171},{-114  138},{-213  39},{-92  160},{-191  61},<br>{-169  83},{-70  182},{-147  105},{-48  204},{-180  72},{-59  193},{-158  94},{-37  215},{-136  116} |
| 80MHz, i=1:36 | {-447  53},{-359  141},{-403  97},{-315  185},{-271  229},{-227  273},{-139  361},{-183  317},{-95  405},<br>{-117  383},{-425  75},{-73  427},{-381  119},{-161  339},{-337  163},{-249  251},{-293  207},{-205  295},<br>{-194  306},{-106  394},{-150  350},{-62  438},{-414  86},{-370  130},{-282  218},{-326  174},{-238  262},<br>{-260  240},{-172  328},{-216  284},{-128  372},{-304  196},{-84  416},{-392  108},{-436  64},{-348  152} |

Pilot Indices for Transmission of a 52-tone dRU

| PPDU BW | $K_{dRU52_i}$ |
|---|---|
| 20MHz, i=1:4 | {-111  -89  15  37},{-100  -78  26  48},{-56  -34  70  92},{-45  -23  81  103} |
| 40MHz, i=1:8 | {-224 -125  28  127},{-202 -103  50  149},{-213 -114  39  138},{-191 -92  61  160},<br>{-169 -70  83  182},{-147 -48  105  204},{-158 -59  94  193},{-136 -37  116  215} |
| 80MHz, i=1:16 | {-447 -359  53  141},{-403 -315  97  185},{-227 -139  273  361},{-95  317  405},<br>{-425 -117  75  383},{-381 -73  119  427},{-337 -249  163  251},{-293 -205  207  295},<br>{-194 -106  306  394},{-150 -62  350  438},{-370 -282  130  218},{-326 -238  174  262},<br>{-260 -172  240  328},{-216 -128  284  372},{-392 -84  108  416},{-436 -348  64  152} |

Pilot Indices for Transmission of a 106-tone dRU

| PPDU BW | KdRU106$_i$ |
|---|---|
| 20MHz, i=1:2 | {-111 -89 15 37}, {-45 -23 81 103} |
| 40MHz, i=1:4 | {-224 -125 28 127}, {-191 -92 61 160}, {-169 -70 83 182}, {-136 -37 116 215} |
| 80MHz, i=1:8 | {-447 -359 53 141}, {-227 -139 273 361}, {-425 -117 75 383}, {-337 -249 163 251}, {-194 -106 306 394}, {-370 -282 130 218}, {-260 -172 240 328}, {-392 -84 108 416} |

Pilot Indices for Transmission of a 242-tone dRU

| PPDU BW | KdRU242$_i$ |
|---|---|
| 40MHz, i=1:2 | {-224 -191 -125 -92 28 61 127 160}, {-169 -136 -70 -37 83 116 182 215} |
| 80MHz, i=1:4 | {-447 -359 -227 -139 53 141 273 361}, {-425 -337 -249 -117 75 163 251 383}, {-370 -282 -194 -106 130 218 306 394}, {-392 -260 -172 -84 108 240 328 416} |

Pilot Indices for Transmission of a 484-tone dRU

| PPDU BW | KdRU484$_i$ |
|---|---|
| 80MHz, i=1:2 | {-447 -425 -359 -337 -249 -227 -139 -117 53 75 141 163 251 273 361 383}, {-392 -370 -282 -260 -194 -172 -106 -84 108 130 218 240 306 328 394 416} |

Pilot Indices for dRU Transmission on BW20

| dRU Type | KdRU_i |
|---|---|
| dRU26, i=1:9 | {-75 60}, {-71 64}, {-64 71}, {-60 75}, {-58 59}, {-74 61}, {-70 65}, {-63 72}, {-59 67} |
| dRU52, i=1:4 | {-98 -35 28 91}, {-91 -28 35 98}, {-97 -34 29 92}, {-90 -27 31 94} |
| dRU106, i=1:2 | {-107 -48 51 109}, {-108 -50 47 106} |

BW40

Pilot Indices for dRU Transmission on BW40

| dRU Type | KdRU_i |
|---|---|
| dRU26, i=1:18 | {-152 118}, {-143 127}, {-148 122}, {-139 131}, {-117 153}, {-150 120}, {-141 129}, {-146 124}, {-137 133}, {-133 137}, {-124 146}, {-129 141}, {-120 150}, {-131 139}, {-144 126}, {-122 148}, {-127 143}, {-118 152} |
| dRU52, i=1:8 | {-197 -71 55 181}, {-193 -67 59 185}, {-195 -69 57 183}, {-191 -65 61 187}, {-187 -61 65 191}, {-183 -57 69 195}, {-185 -59 67 193}, {-181 -55 71 197} |
| dRU106, i=1:4 | {-220 -103 95 212}, {-218 -101 97 214}, {-214 -97 101 218}, {-212 -95 103 220}, |
| dRU242, i=1:2 | {-231 -179 -96 -44 41 93 176 228}, {-230 -178 -93 -41 44 96 180 233}, |

Pilot Indices for dRU Transmission on BW80

| dRU Type | KdRU_i |
|---|---|
| dRU26, i=1:36 | {−303 −287 233 249},{−295 241},{−279 257},{−235 301},{−299 237},{−283 253},{−291 245},{−275 261},<br>{−261 −245 275 291},{−253 283},{−237 299},{−269 267},{−265 271},{−249 287},{−257 279},{−241 295},<br>{−302 −286 234 250},{−294 242},{−278 258},{−234 302},{−298 238},{−282 254},{−290 246},{−274 262},<br>{−260 −244 276 292},{−252 284},{−236 300},{−268 268},{−264 272},{−248 288},{−256 280},{−240 296} |
| dRU52, i=1:16 | {−395 −143 105 357},{−387 −135 113 365},{−391 −139 109 361},{−383 −131 117 369},<br>{−369 −117 131 383},{−361 −109 139 391},{−373 −121 127 379},{−365 −113 135 387},<br>{−394 −142 106 358},{−386 −134 114 366},{−390 −138 110 362},{−382 −130 118 370},<br>{−368 −116 132 384},{−360 −108 140 392},{−372 −120 128 380},{−364 −112 136 388} |
| dRU106, i=1:8 | {−447 −215 197 429},{−443 −211 201 433},{−437 −205 207 439},<br>{−446 −214 198 430},{−442 −210 202 434},{−432 −200 212 444},{−436 −204 208 440}, |
| dRU242, i=1:4 | {−475 −371 −203 −99 93 197 365 469},{−469 −365 −197 −93 99 203 371 475},<br>{−474 −370 −202 −98 94 198 366 470},{−468 −364 −196 −92 100 204 372 476}, |
| dRU484, i=1:2 | {−487 −435 −351 −299 −219 −167 −83 −31 31 83 167 219 299 351 435 487},<br>{−486 −434 −350 −298 −218 −166 −82 −30 32 84 168 220 300 352 436 488}, |

| RU size | $RU_{start}$ | $\{l_i\}$ |
|---|---|---|
| 26 | {0 4 2 6 8 1 5 3 7} | {0} |
| 52 | {0 2 1 3} | {0,4} |
| 106 | {0 1} | {0,2,4,6} |

BW40, Np = 18

| RU size | $RU_{start}$ | $\{l_i\}$ |
|---|---|---|
| 26 | {0 9 4 13 17 2 11 6 15 1 10 5 14 8 3 12 7 16} | {0} |
| 52 | {0 4 2 6 1 5 3 7} | {0,9} |
| 106 | {0 2 1 3} | {0,4,9,13} |
| 242 | {0,0} | {0,2,4,6,9,11,13,15,17} |
| | | {1,3,5,7,8,10,12,14,16} |

BW80, Np = 36

| RU size | $RU_{start}$ | $\{l_i\}$ |
|---|---|---|
| 52 | {0,8,4,12,6,14,2,10,1,9,5,13,7,15,3,11} | {0,16} |
| 106 | {0,4,6,2,1,5,7,3} | {0,8,16,24} |
| 242 | {0,2,1,3} | {0:4:32} |
| 484 | {0,1} | {0:2:34} |

FIG. 32

Pilot Indices for dRU Transmission on BW20

BW20

| dRU Type | KdRU_i |
|---|---|
| dRU26, i=1:9 | {-102  33}, {-62  73}, {-82  53}, {-42  93}, {-22  104}, {-92  43}, {-52  83}, {-72  63}, {-32  112} |
| dRU52, i=1:4 | {-107 -44  19  82}, {-87 -24  39  102}, {-97 -34  29  92}, {-77 -14  45  108} |
| dRU106, i=1:2 | {-109 -51  48  107}, {-99 -41  56  115} |

Pilot Indices for dRU Transmission on BW40

BW40

| dRU Type | KdRU_i |
|---|---|
| dRU26, i=1:18 | {-188  82}, {-179  91}, {-112  158}, {-103  167}, {-207  63}, {-150  120}, {-141  129}, {-74  196}, {-65  205}, {-169  101}, {-160  110}, {-93  177}, {-84  186}, {-198  72}, {-131  139}, {-122  148}, {-55  215}, {-46  224} |
| dRU52, i=1:8 | {-233 -107  19  145}, {-193 -67  59  185}, {-213 -87  39  165}, {-173 -47  79  205}, {-223 -97  29  155}, {-183 -57  69  195}, {-203 -77  49  175}, {-163 -37  89  215} |
| dRU106, i=1:4 | {-229 -112  86  203}, {-209 -92  106  223}, {-219 -102  96  213}, {-199 -82  116  233}, |
| dRU242, i=1:2 | {-231 -179 -96 -44  41  93  176  228}, {-223 -172 -88 -36  51  103  186  238}, |

Pilot Indices for dRU Transmission on BW80

3400

| dRU Type | KdRU_i |
|---|---|
| dRU26, i=1:36 | {-411 125},{-403 133},{-135 401},{-163 373},{-227 309},{-283 253},{-255 281},{-311 225},<br>{-153 383},{-209 327},{-181 355},{-237 299},{-89 447},{-301 235},{-357 179},{-329 207},{-385 151},<br>{-338 198},{-394 142},{-366 170},{-98 438},{-126 410},{-190 346},{-246 290},{-218 318},{-274 262},<br>{-116 420},{-172 364}, {-144 392},{-200 336}, {-376 160},{-264 272},{-320 216},{-292 244},{-348 188} |
| dRU52, i=1:16 | {-447 -195 53 305}, {-459 -207 41 293},{-371 -119 129 381},{-383 -131 117 369},<br>{-333 -81 167 419},{-345 -93 155 407},{-409 -157 91 343},{-421 -169 79 331},<br>{-430 -178 70 322},{-438 -186 62 314},{-354 -102 146 398},{-362 -110 138 390},<br>{-316 -64 184 436},{-324 -72 176 428},{-392 -140 108 360},{-400 -148 100 352} |
| dRU106, i=1:8 | {-483 -251 161 393}, {-443 -211 201 433},{-425 -189 219 455},{-465 -229 179 415},<br>{-474 -242 170 402},{-434 -202 210 442},{-416 -180 228 464},{-456 -220 188 424}, |
| dRU242, i=1:4 | {-483 -379 -211 -107 85 189 357 461},{-465 -361 -193 -89 103 207 375 479},<br>{-474 -370 -202 -98 94 198 366 470},{-456 -352 -184 -80 112 216 384 488}, |
| dRU484, i=1:2 | {-487 -435 -351 -299 -219 -167 -83 -31 31 83 167 219 299 351 435 487},<br>{-478 -426 -342 -290 -210 -158 -74 -22 40 92 176 228 308 360 444 496}, |

3500

BW20

| dRU Type | Pilot Indices for dRU Transmission on BW20 |
| --- | --- |
| | KdRU_i |
| dRU26, i=1:9 | {-111,15}, {-62,64},{-37,89}, {-87,39}, {-13,113}, {-74,52}, {-25,101}, {-99,27}, {-50,76} |
| dRU52, i=1:4 | {-111 -62 15 64}, {-87 -37 39 89}, {-74 -25 52 101}, {-99 -50 27 76} |
| dRU106, i=1:2 | {-111 -62 15 64}, {-74 -25 52 101} |

BW20

| dRU Type | Pilot Indices for dRU Transmission on BW20 |
| --- | --- |
| | KdRU_i |
| dRU26, i=1:9 | {-111, 15}, {-89 37},{-100 26}, {-78 48}, {-67 59}, {-56 70}, {-34 92}, {-45 81}, {-23 103} |
| dRU52, i=1:4 | {-111 -89 15 37}, {-100 -78 26 48}, {-56 -34 70 92}, {-45 -23 81 103} |
| dRU106, i=1:2 | {-111 -78 15 48}, {-56 -23 70 103} |

Pilot Indices for dRU Transmission on BW40

| dRU Type | KdRU_i |
|---|---|
| dRU26, i=1:18 | {-224,28}, {-107,145},{-58,194},{-175,77}, {-117,135}, {-150,102}, {-33,219}, {-200,52},{-83,169}, {-187,65}, {-70,182},{-21,231}, {-138,114}, {-126,126}, {-95,157},{-212,40}, {-163, 89}, {-46,206} |
| dRU52, i=1:8 | {-224 -107  28 145}, {-175 -58  77 194}, {-150 -33 102 219}, {-200 -83  52 169}, {-187 -70  65 182}, {-138 -21 114 231}, {-212 -95  40 157}, {-163 -46  89 206} |
| dRU106, i=1:4 | {-224 -107  28 145}, {-150 -33 102 219}, {-212 -95  40 157}, {-138 -21 114 231}, |
| dRU242, i=1:2 | {-224 -150 -107 -33  28 102 145 219}, {-212 -138 -95 -21  40 114 157 231}, |

BW40

Pilot Indices for dRU Transmission on BW40

| dRU Type | KdRU_i |
|---|---|
| dRU26, i=1:18 | {-206  46}; {-197  55}; {-130 122}; {-121 131}; {-45 207}; {-168  84}; {-159  93}; {-92 160}; {-83 169}; {-187  65}; {-178  74};{-111 141};{-102 150}; {-54 198}; {-149 103}; {-140 112}; {-73 179}; {-64 188}; |
| dRU52, i=1:8 | {-206 -197  46  55}; {-130 -121 122 131}; {-168 -159  84  93}; {-92 -83 160 169}; {-187 -178  65  74}; {-111 -102 141 150}; {-149 -140 103 112}; {-73 -64 179 188} |
| dRU106, i=1:4 | {-206 -130  46 122}; {-168 -92  84 160}, {-187 -111  65 141}, {-149 -73 103 179}, |
| dRU242, i=1:2 | {-206 -168 -130 -92  46  84 122 160}, {-187 -149 -111 -73  65 103 141 179}, |

Pilot Indices for dRU Transmission on BW40

| dRU Type | KdRU_j |
|---|---|
| dRU26, i=1:18 | {-206 -197 46 55}; {-197 46 55}; {-130 122}; {-121 131}; {-45 207}; {-168 84}; {-159 93}; {-92 160}; {-83 169}; {-187 -178 65 74}; {-178 65 74}; {-111 141}; {-102 150}; {-54 198}; {-149 103}; {-140 112}; {-73 179}; {-64 188}; |
| dRU52, i=1:8 | {-206 -197 46 55}, {-130 -121 122 131}, {-168 -159 84 93}, {-92 -83 160 169}, {-187 -178 65 74}, {-111 -102 141 150}, {-149 -140 103 112}, {-73 -64 179 188} |
| dRU106, i=1:4 | {-206 -121 46 131}, {-168 -83 84 169}, {-187 -102 65 150}, {-149 -64 103 188} |
| dRU242, i=1:2 | {-206 -168 -121 -83 46 84 131 169}, {-187 -149 -102 -64 65 103 150 188}; |

BW40

Pilot Indices for dRU Transmission on BW40

| dRU Type | KdRU_j |
|---|---|
| dRU26, i=1:18 | {-206 -197 46 55}; {-197 46 55}, {-130 122}; {-121 131}; {-45 207}; {-168 84}; {-159 93}; {-92 160}; {-83 169}; {-187 -178 65 74}; {-178 65 74}; {-111 141}; {-102 150}; {-54 198}; {-149 103}; {-140 112}; {-73 179}; {-64 188}; |
| dRU52, i=1:8 | {-206 -197 46 55}, {-130 -121 122 131}, {-168 -159 84 93}, {-92 -83 160 169}, {-187 -178 65 74}, {-111 -102 141 150}, {-149 -140 103 112}, {-73 -64 179 188} |
| dRU106, i=1:4 | {-206 -130 55 131}, {-168 -92 93 169}, {-187 -111 74 150}, {-149 -73 112 188} |
| dRU242, i=1:2 | {-206 -168 -130 -92 55 93 131 169}, {-187 -149 -111 -73 74 112 150 188} |

FIG. 37

Pilot Indices for dRU Transmission on BW80

BW80

| dRU Type | KdRU_i |
|---|---|
| dRU26, i=1:36 | {-447 -251 249},{-351 -151 349},{-307 193},{-299 201},{-103 397},{-399 101},{-203 297},<br>{-225 275},{-425 75},{-325 175},{-129 371},{-233 267},{-177 323},{-77 423},{-277 223},<br>{-410 90},{-214 286},{-314 -114 386},{-314 186},{-270 230},{-262 238},{-66 434},{-362 138},{-166 334},<br>{-188 312},{-388 112},{-288 212},{-92 408},{-196 304},{-336 164},{-140 360},{-436 64},{-240 260} |
| dRU52, i=1:16 | {-447 -251 53 249},{-351 -151 149 349},{-399 -203 101 297},<br>{-425 -225 75 275},{-325 -129 175 371},{-373 -177 127 323},{-277 -77 223 423},<br>{-410 -214 90 286},{-314 -114 186 386},{-262 -66 238 434},{-362 -166 138 334},<br>{-388 -188 112 312},{-288 -92 212 408},{-336 -140 164 360},{-436 -240 64 260} |
| dRU106, i=1:8 | {-447 -251 53 249},{-399 -203 101 297},{-425 -225 75 275},{-373 -177 127 323},<br>{-425 -114 186 386},{-262 -66 238 434},{-336 -140 164 360}, |
| dRU242, i=1:4 | {-447 -399 -251 -203 53 101 249 297},{-425 -373 -225 -177 75 127 275 323},<br>{-314 -262 -114 -66 186 238 386 434},{-336 -288 -140 -92 164 212 360 408}; |
| dRU484, i=1:2 | {-447 -425 -399 -373 -251 -225 -203 -177 53 75 101 127 249 275 297 323},<br>{-336 -314 -288 -262 -140 -114 -92 -66 164 186 212 238 360 386 408 434}, |

FIG. 38

Pilot Indices for dRU Transmission on BW80

| BW80 | | |
|---|---|---|
| dRU Type | KdRU_i | |
| dRU26, i=1:36 | {-447 53}, {-251 249},{-351 149},{-307 193},{-299 201}, {-103 397},{-399 101},{-203 297},<br>{-225 275}, {-425 75},{-325 175},{-129 371}, {-233 267}, {-373 127},{-177 323},{-77 423},{-277 223},<br>{-410 90}, {-214 286},{-314 -114 386},{-129 175},{-270 230}, {-262 238}, {-66 434},{-362 138},{-166 334},<br>{-188 312},{-388 112},{-288 212},{-92 408}, {-196 304},{-140 360}, {-336 164},{-436 64}, {-240 260} | |
| dRU52, i=1:16 | {-447 -251 53 249}, {-351 -151 149 349},{-299 -103 201 397},{-399 -203 101 297},<br>{-425 -225 75 275},{-325 -129 175 371},{-373 -177 127 323}, {-277 -77 223 423},<br>{-410 -214 90 286},{-314 -114 186 386},{-262 -66 238 434},{-362 -166 138 334},<br>{-388 -188 112 312},{-288 -92 212 408},{-336 -140 164 360},{-436 -240 64 260} | |
| dRU106, i=1:8 | {-447 -251 53 249}, {-299 -103 201 397},{-425 -225 75 275},{-277 -77 223 423},<br>{-410 -214 90 286},{-262 -66 238 434},{-288 -92 212 408},{-436 -240 64 260}, | |
| dRU242, i=1:4 | {-447 -299 -251 -103 53 201 249 397},{-425 -277 -225 -77 75 223 275 423},<br>{-410 -262 -214 -66 90 238 286 434},{-436 -288 -240 -92 64 212 260 408}, | |
| dRU484, i=1:2 | {-447 -425 -299 -277 -251 -225 -103 -77 53 75 201 223 249 275 397 423},<br>{-436 -410 -288 -262 -240 -214 -92 -66 64 90 212 238 260 286 408 434}, | |

FIG. 39

Pilot Indices for dRU Transmission on BW80

BW80

| dRU Type | KdRU_i |
|---|---|
| dRU26, i=1:36 | {-447 53}, {-251 249},{-351 149},{-307 193},{-299 201}, {-103 397},{-399 101},{-203 297}, {-225 275}, {-425 75},{-151 -325 175},{-129 371}, {-233 267},{-373 127},{-177 323},{-77 423}, {-277 223}, {-410 90}, {-214 286},{-114 286},{-314 186}, {-270 230}, {-262 238}, {-66 434}, {-362 -166 138 334}, {-188 312}, {-388 112},{-288 212},{-92 408}, {-196 304},{-140 360},{-436 64}, {-240 260} |
| dRU52, i=1:16 | {-447 -251 53 249}, {-351 -151 149 349},{-299 -103 201 397},{-399 -203 101 297}, {-425 -225 75 275},{-325 -129 175 371},{-373 -177 127 323},{-277 -77 223 423}, {-410 -214 90 286},{-314 -114 186 386},{-262 -66 238 434},{-362 -166 238 334}, {-388 -188 112 312},{-288 -92 212 408},{-336 -140 164 360},{-436 -240 64 260} |
| dRU106, i=1:8 | {-447 -251 53 249}, {-399 -203 101 297},{-325 -129 175 371},{-277 -77 223 423}, {-425 -225 75 275}, {-373 -177 127 323},{-362 -166 238 138 334}, {-314 -114 186 386},{-262 -66 238 434},{-336 -140 164 360},{-436 -240 64 260}, |
| dRU242, i=1:4 | {-447 -399 -251 -203 53 101 249 297}, {-325 -277 -129 -77 175 223 371 423}, {-314 -262 -114 -66 186 238 386 434},{-436 -388 -240 -188 64 112 260 312}, |
| dRU484, i=1:2 | {-447 -399 -325 -277 -251 -203 -129 -77 53 101 175 223 249 297 371 423}, {-436 -388 -314 -262 -240 -188 -114 -66 64 112 186 238 260 312 386 434}, |

FIG. 40

Pilot Indices for dRU Transmission on BW80

BW80

| dRU Type | KdRU_i |
|---|---|
| dRU52, i=1:16 | {-447 -231 53 269}; {-423 -207 77 293}; {-463 -247 37 253}; {-435 -219 65 281};<br>{-353 -137 147 363}; {-325 -109 175 391}; {-337 -121 163 379}; {-313 -97 187 403};<br>{-394 -178 106 322}; {-366 -150 134 350}; {-406 -190 94 310}; {-382 -166 118 334};<br>{-296 -80 204 420}; {-272 -56 228 444}; {-284 -68 216 432}; {-256 -40 244 460}; |
| dRU106, i=1:8 | {-447 -231 53 269}, {-463 -247 37 253},{-353 -137 147 363},{-337 -121 163 379},<br>{-394 -178 106 322},{-406 -190 94 310},{-296 -80 204 420},{-284 -68 216 432}, |
| dRU242, i=1:4 | {-463 -447 -247 -231 37 53 253 269}, {-353 -337 -137 -121 147 163 363 379}<br>{-406 -394 -190 -178 94 106 310 322},{-296 -284 -80 -68 204 216 420 432}, |
| dRU484, i=1:2 | {-463 -447 -353 -337 -247 -231 -137 -121 37 53 147 163 253 269 363 379},<br>{-406 -394 -296 -284 -190 -178 -80 -68 94 106 204 216 310 322 420 432}, |

FIG. 41

Pilot Indices for dRU Transmission on BW80

BW80

| dRU Type | KdRU_i |
|---|---|
| dRU52, i=1:16 | {-447 -231 53 269}; {-423 -207 77 293}; {-463 -247 37 253}; {-435 -219 65 281}; {-353 -137 147 363}; {-325 -109 175 391}; {-337 -121 163 379}; {-313 -97 187 403}; {-394 -178 106 322}; {-366 -150 134 350}; {-406 -190 94 310}; {-382 -166 118 334}; {-296 -80 204 420}; {-272 -56 228 444}; {-284 -68 216 432}; {-256 -40 244 460}; |
| dRU106, i=1:8 | {-447 -207 53 293}, {-463 -219 37 281}, {-353 -109 147 391}, {-337 -97 163 403}, {-394 -150 106 350}, {-406 -166 94 334}, {-296 -56 204 444}, {-284 -40 216 460}, |
| dRU242, i=1:4 | {-463 -447 -219 -207 37 53 281 293}, {-353 -337 -109 -97 147 163 391 403}, {-406 -394 -166 -150 94 106 334 350}, {-296 -284 -56 -40 204 216 444 460}, |
| dRU484, i=1:2 | {-463 -447 -353 -337 -219 -207 -109 -97 37 53 147 163 281 293 391 403}, {-406 -394 -296 -284 -166 -150 -56 -40 94 106 204 216 334 350 444 460}, |

FIG. 42

Pilot Indices for dRU Transmission on BW80

| BW80 | | |
|---|---|---|
| dRU Type | KdRU_i | |
| dRU52, i=1:16 | {-447 -231 53 269}; {-423 -207 77 293}; {-463 -247 37 253}; {-435 -219 65 281}; {-353 -137 147 363}; {-325 -109 175 391}; {-337 -121 163 379}; {-313 -97 187 403}; {-394 -178 106 322}; {-366 -150 134 350}; {-406 -190 94 310}; {-382 -166 118 334}; {-296 -80 204 420}; {-272 -56 228 444}; {-284 -68 216 432}; {-256 -40 244 460}; | |
| dRU106, i=1:8 | {-447 -231 77 293}, {-463 -247 65 281}, {-353 -137 175 391}, {-337 -121 187 403}, {-394 -178 134 350}, {-406 -190 118 334}, {-296 -80 228 444}, {-284 -68 244 460}, | |
| dRU242, i=1:4 | {-463 -447 -247 -231 65 77 281 293}, {-353 -337 -137 -121 175 187 391 403}, {-406 -394 -190 -178 118 134 334 350}, {-296 -284 -80 -68 228 244 444 460}, | |
| dRU484, i=1:2 | {-463 -447 -353 -337 -247 -231 -137 -121 65 77 175 187 281 293 391 403}, {-406 -394 -296 -284 -190 -178 -80 -68 118 134 228 244 334 350 444 460}, | |

FIG. 43

PILOT TONE DESIGN FOR DISTRIBUTED-TONE RESOURCE UNITS IN 6GHz LOW-POWER INDOOR SYSTEMS

CROSS REFERENCE TO RELATED PATENT APPLICATION

The present disclosure is part of a non-provisional patent application claiming the priority benefit of U.S. Provisional Patent Application Nos. 63/150,154, 63/231,809 and 63/232,699, filed 17 Feb. 2021, 11 Aug. 2021 and 13 Aug. 2021, respectively, the contents of which being incorporated by reference in their entirety.

TECHNICAL FIELD

The present disclosure is generally related to wireless communications and, more particularly, to pilot tone design for distributed-tone resource units (dRUs) in 6 GHz low-power indoor (LPI) systems.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4-GHz and 5-GHz bands, the equivalent isotropically radiated power (EIRP) of a power spectral density (PSD) limit is capped at 20 dBm for 2-MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6-GHz LPI applications is far more stringent than PSD requirement for the 2.4-GHz and 5-GHz bands. For instance, the EIRP limit is at 5 dBm/MHz for an access point (AP) in 6-GHz LPI versus an EIRP limit of 17 dBm/MHz for APs in the 5-GHz band. Similarly, the EIRP limit is at −1 dBm/MHz for an non-AP in 6-GHz LPI versus an EIRP limit of 11 dBm/MHz for non-APs in the 5-GHz band.

Distributed-tone resource units (RUs) and multi-RU (MRU) have been proposed to spread subcarriers over a wider bandwidth to boost transmit power and extend coverage range, and several pilot tone design methods have been proposed to assign pilot tones in a dRU. However, the pilot tones from all triggered uplink (UL) trigger-based (TB) orthogonal frequency-division multiple-access (OFDMA) dRUs may be squeezed in several clusters at an AP receiver, and the "clustered" pilots from all stations (STAs) received by AP may potentially have issues for narrowband interference (NBI). Therefore, there is a need for a solution to optimize pilot tone design for distributed-tone RUs in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to pilot tone design for distributed-tone RUs (dRUs) in 6 GHz LPI systems. It is believed that the pilot tone design under various proposed schemes may achieve some benefits. Specifically, it is believed that the proposed pilot tone design may spread pilot tones over an entire bandwidth or frequency subblock with no resultant cluster and with no pilot tones being adjacent with each other. Additionally, overall pilot tones may be evenly or near-evenly distributed under the proposed pilot tone design. Moreover, under the proposed pilot tone design, the hierarchical structure for regular RU pilot tones may be maintained for pilot tones of dRUs. For instance, pilot tones of a 52-tone dRU may include pilot tones from corresponding two 26-tone dRUs, pilot tones of a 106-tone dRU may include pilot tones from corresponding two 52-tone dRUs, pilot tones of a 242-tone dRU may include pilot tones from corresponding two 106-tone dRUs, and pilot tones of a 484-tone dRU may include pilot tones from corresponding two 242-tone dRUs.

In one aspect, a method may involve generating a plurality of pilot tones of a dRU (e.g., by distributing subcarriers of a RU) based on a hierarchical structure of pilot tones that is used for a regular RU (rRU). The method may also involve communicating using the dRU.

In another aspect, an apparatus may include a transceiver configured to transmit and receive wirelessly. The apparatus may also include a processor coupled to the transceiver. The processor may generate a plurality of pilot tones of a dRU (e.g., by distributing subcarriers of a RU) based on a hierarchical structure of pilot tones that is used for a rRU. The processor may also communicate, via the transceiver, using the dRU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example design in accordance with an implementation of the present disclosure.

FIG. 7 is a diagram of an example design in accordance with an implementation of the present disclosure.

FIG. 8 is a diagram of an example design in accordance with an implementation of the present disclosure.

FIG. 11 is a diagram of an example design in accordance with an implementation of the present disclosure.

FIG. 12 is a diagram of an example design in accordance with an implementation of the present disclosure.

FIG. 13 is a diagram of an example design in accordance with an implementation of the present disclosure.

FIG. 14 is a diagram of an example design in accordance with an implementation of the present disclosure.

FIG. 15 is a diagram of an example design in accordance with an implementation of the present disclosure.

FIG. 25 is a diagram of an example design in accordance with an implementation of the present disclosure.

FIG. 26 is a diagram of an example design in accordance with an implementation of the present disclosure.

FIG. 27 is a diagram of an example design in accordance with an implementation of the present disclosure.

FIG. 28 is a diagram of an example design in accordance with an implementation of the present disclosure.

FIG. 29 is a diagram of an example design in accordance with an implementation of the present disclosure.

FIG. 30 is a diagram of an example design in accordance with an implementation of the present disclosure.

FIG. 32 is a diagram of an example design in accordance with an implementation of the present disclosure.

FIG. 33 is a diagram of an example design in accordance with an implementation of the present disclosure.

FIG. 35 is a diagram of an example design in accordance with an implementation of the present disclosure.

FIG. 36 is a diagram of an example design in accordance with an implementation of the present disclosure.

FIG. 37 is a diagram of an example design in accordance with an implementation of the present disclosure.

FIG. 38 is a diagram of an example design in accordance with an implementation of the present disclosure.

FIG. 39 is a diagram of an example design in accordance with an implementation of the present disclosure.

FIG. 40 is a diagram of an example design in accordance with an implementation of the present disclosure.

FIG. 41 is a diagram of an example design in accordance with an implementation of the present disclosure.

FIG. 42 is a diagram of an example design in accordance with an implementation of the present disclosure.

FIG. 43 is a diagram of an example design in accordance with an implementation of the present disclosure.

DETAILED DESCRIPTION OF PREFERRED EMBODIMENTS

Figure 1:
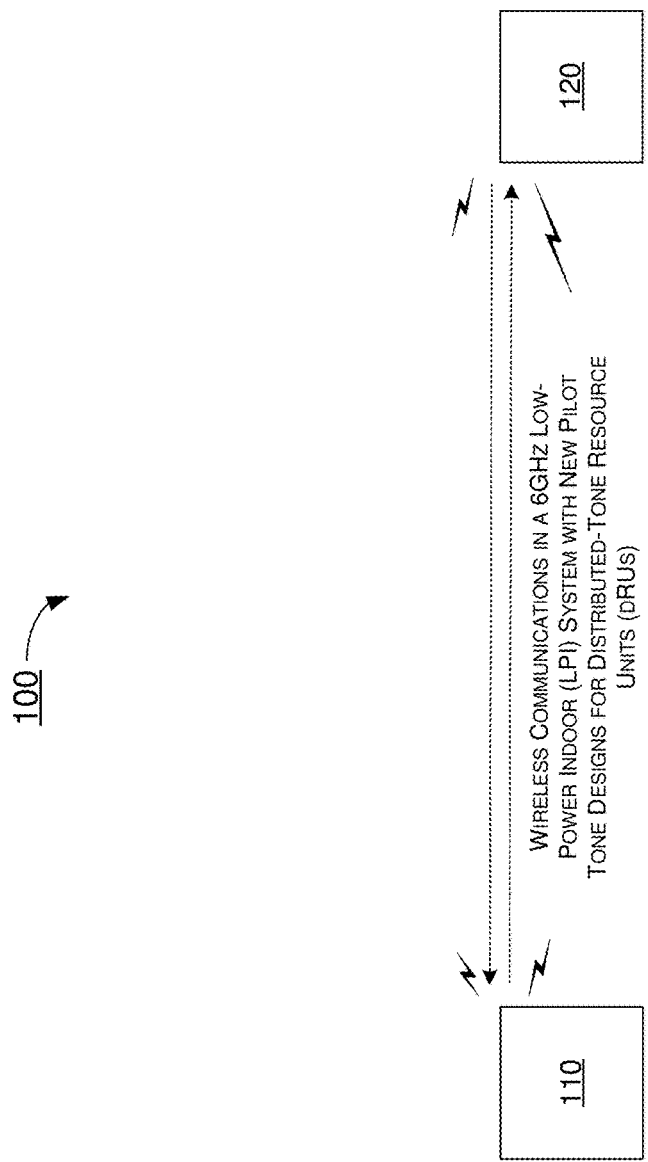
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to pilot tone design for distributed-tone RUs in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on. Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone or interlaced-tone RU may be interchangeably denoted as iRU26, a 52-tone interleaved-tone or interlaced-tone RU may be interchangeably denoted as iRU52, a 106-tone interleaved-tone or interlaced-tone RU may be interchangeably denoted as iRU106, a 242-tone interleaved-tone or interlaced-tone RU may be interchangeably denoted as iRU242, and a 484-tone interleaved-tone or interlaced-tone RU may be interchangeably denoted as iRU484.

FIG. 1 illustrates an example network environment 100 in which various solutions and schemes in accordance with the present disclosure may be implemented. FIG. 2~FIG. 45 illustrate examples of implementation of various proposed schemes in network environment 100 in accordance with the present disclosure. The following description of various proposed schemes is provided with reference to FIG. 1~FIG. 45.

Referring to FIG. 1, network environment 100 may involve a communication entity 110 and a communication entity 120 communicating wirelessly (e.g., in a WLAN in accordance with one or more Institute of Electrical and Electronics Engineers (IEEE) 802.11 standards). For instance, communication entity 110 may be a first STA and communication entity 120 may be a second STA, with each of the first STA and second STA functioning an access point (AP) STA or a non-AP STA. Under various proposed schemes in accordance with the present disclosure, communication entity 110 and communication entity 120 may be configured to communicate wirelessly with pilot tone designs for distributed-tone RUs in 6 GHz LPI systems under various proposed schemes of the present disclosure, as described herein.

In general, the same number of pilot subcarriers in a dRU are kept as that in a rRU with respect to designs of pilot subcarriers for dRUs. For instance, each 26-tone dRU may have two pilot tones, each 52-tone dRU may have four pilot tones, each 106-tone dRU may have four pilot tones, each 242-tone dRU may have eight pilot tones, and each 484-tone dRU may have sixteen pilot tones. Under various proposed schemes in accordance with the present disclosure, there may be at least two options (Option 1 and Option 2) with respect to dRU pilot tone index design. In Option 1, pilot tones of a dRU may be chosen with pre-specified locations to preserve relative pilot positions as in a rRU, and the pilot tones may be either direct-current (DC) tone-symmetric or DC tone-asymmetric. In Option 2, the same hierarchical structure of pilot tones of a rRU may be maintained for a dRU. For instance, the four pilot tones of a 52-tone dRU may include pilot tones from two corresponding 26-tone dRUs (e.g., by taking two pilot tones per 26-tone dRU). Similarly, the four pilot tones of a 106-tone dRU may include pilot tones from two corresponding 52-tone dRUs (e.g., by taking two pilot tones from each 52-tone dRU). Likewise, the eight pilot tones of a 242-tone dRU may include pilot tones from two corresponding 106-tone dRUs (e.g., by taking four pilot tones from each 106-tone dRU). Moreover, the sixteen tones of a 484-tone dRU may include pilot tones from two corresponding 242-tone dRUs (e.g., by taking eight pilot tones from each 242-tone dRU). Under the various proposed schemes, values of regular RU pilot tones under IEEE 802.11be may be reused for dRU pilot tone values. Moreover, pilot mapping rule(s) for regular RU pilot tones under IEEE 802.11be may be reused for dRU pilot tone mapping under the proposed schemes.

Figure 2:
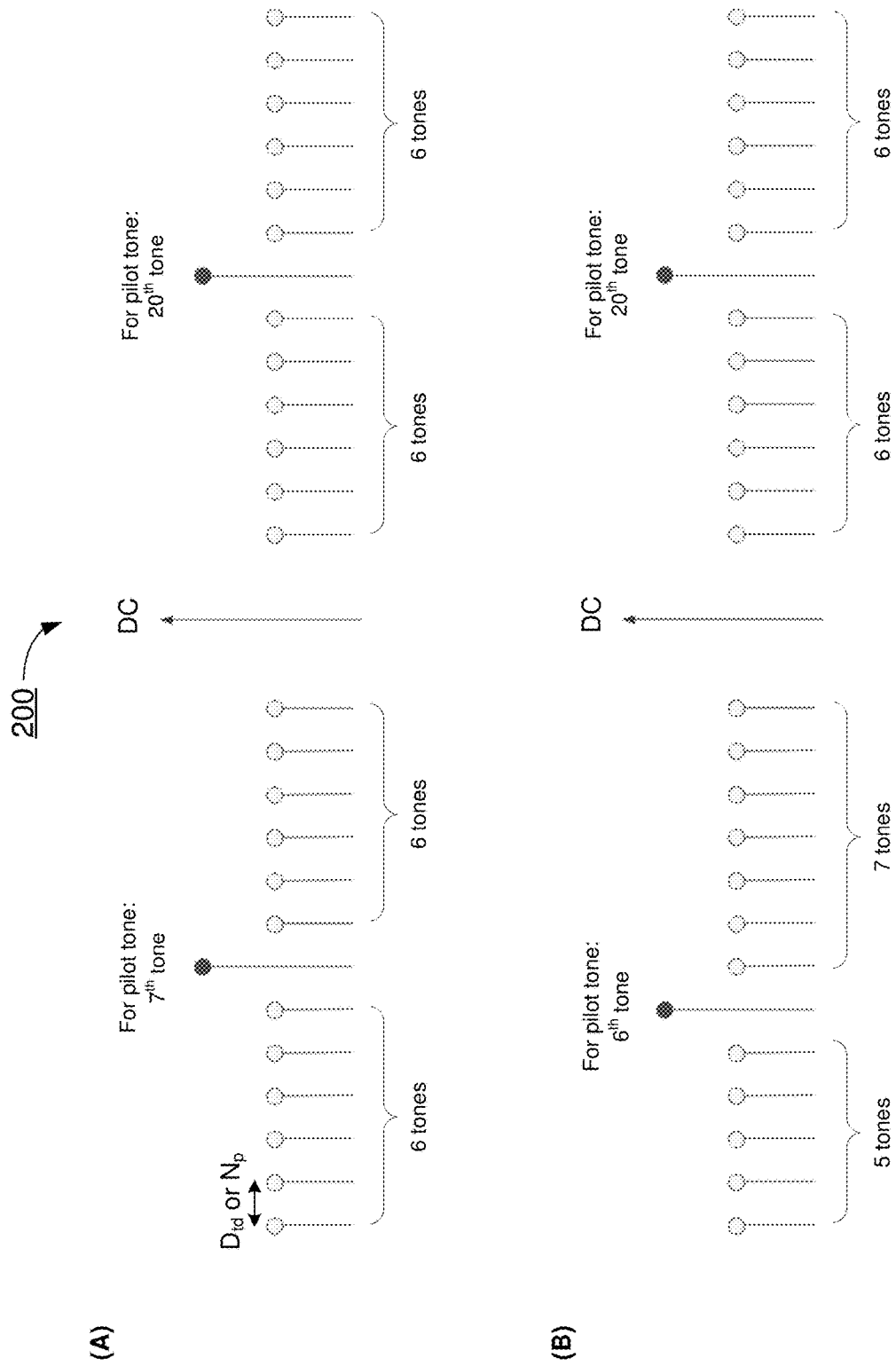
FIG. 2 is a diagram of an example scenario in accordance with an implementation of the present disclosure.

FIG. 2 illustrates an example scenario 200 of a pilot tone design for a 26-tone dRU under a proposed scheme in accordance with the present disclosure. Given that the subcarrier tones of a dRU span across a DC tone, a 26-tone dRU may have thirteen tones in a low part (or left part) and thirteen tones in an upper part (or right part). There are two options (Option-1a and Option-1b) for pilot tone design for a 26-tone dRU in scenario 200, with Option-1a shown in part (A) of FIG. 2 and Option-1b shown in part (B) of FIG. 2. In Option-1a, similar to the pilot tone selection for a regular middle 26-tone RU, the $7^{th}$ and $20^{th}$ tones of a dRU26 may be selected from each 26-tone dRU as the pilot tones to preserve the relative pilot positions as in a 26-tone rRU. In Option-1b, relative pilot positions of the pilot tones in the regular 26-tone RU may be preserved by selecting the $6^{th}$ and $20^{th}$ tones of a dRU26 from each 26-tone dRU as the pilot tones. FIG. 3 illustrates an example design 300 of pilot tone indices for a 26-tone dRU under Option-1a.

Figure 4:
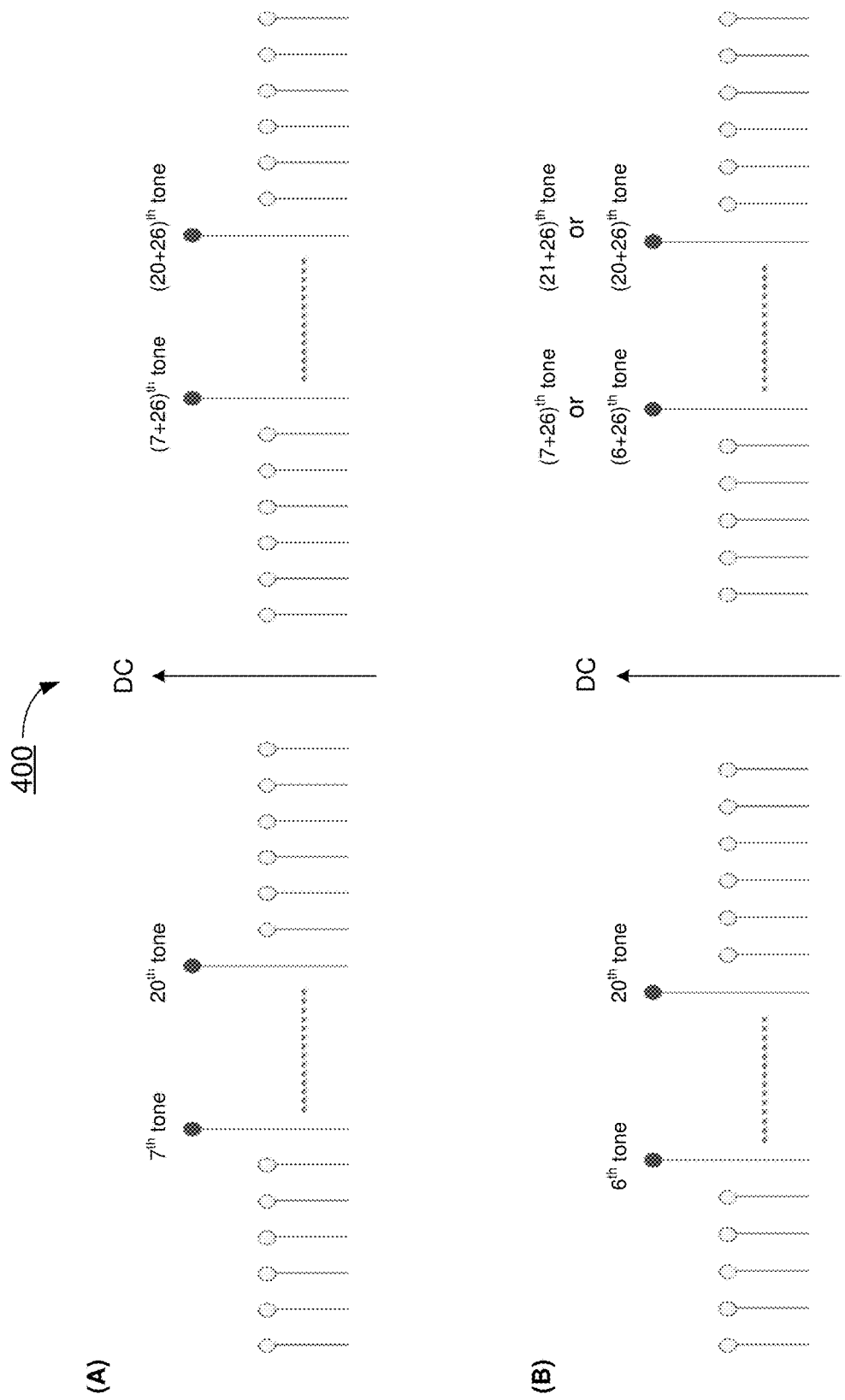
FIG. 4 is a diagram of an example scenario in accordance with an implementation of the present disclosure.
Figure 5:
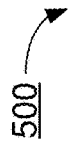
FIG. 5 is a diagram of an example design in accordance with an implementation of the present disclosure.

FIG. 4 illustrates an example scenario 400 of a pilot tone design for a 52-tone dRU under a proposed scheme in accordance with the present disclosure. Although each 52-tone dRU may be built from two 26-tone dRUs, unlike a regular 52-tone RU which may be formed by cascading two continuous 26-tone RUs in the frequency domain, the two 26-tone dRU may spread tones over an entire bandwidth in an interleaved fashion. Accordingly, the pilot tones of a 52-tone dRU may not be directly or simply defined from the pilot tones of two 26-tone dRUs in order to achieve a larger distance between pilot tones. Instead, under the proposed scheme, there are two options (Option-1a and Option-1b) for pilot tone design for a 52-tone dRU in scenario 400, with Option-1a shown in part (A) of FIG. 4 and Option-1b shown in part (B) of FIG. 4. In Option-1a, the $7^{th}$, $20^{th}$, $33^{rd}$ and $46^{th}$ tones of a dRU52 may be selected as the pilot tones for each 52-tone dRU. In Option-1b, the $6^{th}$, $20^{th}$, $32^{nd}$ (or $33^{rd}$) and $46^{th}$ (or $47^{th}$) tones of a dRU52 may be selected as the pilot tones for each 52-tone dRU. FIG. 5 illustrates an example design 500 of pilot tone indices for a 52-tone dRU under Option-1a.

Figure 6:
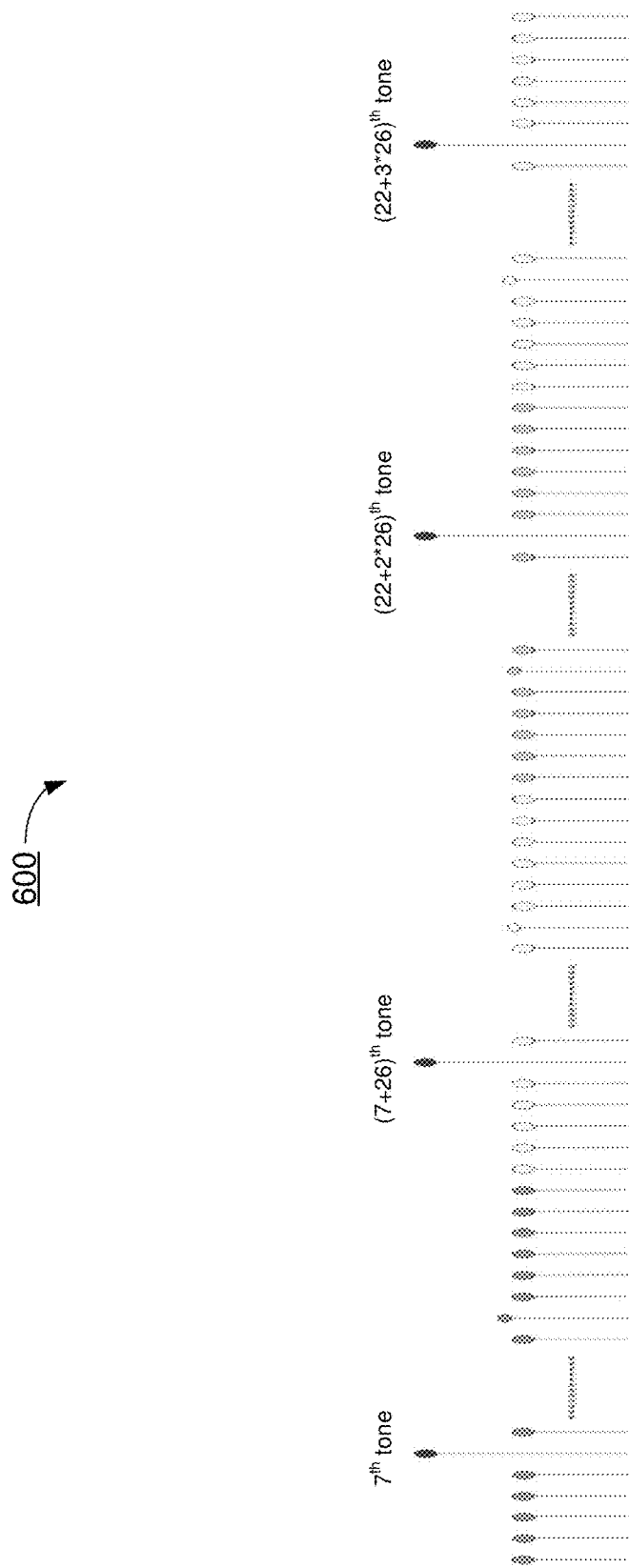
FIG. 6 is a diagram of an example scenario in accordance with an implementation of the present disclosure.

FIG. 6 illustrates an example scenario 600 of a pilot tone design for a 106-tone dRU under a proposed scheme in accordance with the present disclosure. Following the same pilot tone design rules for a 52-tone dRU, the four pilot tones for each 106-tone dRU may be selected from the $7^{th}$, $(7+26)^{th}$ or $33^{rd}$, $(22+2*26)^{th}$ or $74^{th}$ and $(22+3*26)^{th}$ or $100^{th}$ tones of a dRU106. FIG. 7 illustrates an example design 700 of pilot tone indices for a 106-tone dRU under the proposed scheme.

FIG. 8 illustrates an example design 800 of a pilot tone design for a 242-tone dRU under a proposed scheme in accordance with the present disclosure. Following the same pilot tone design rules for a 106-tone dRU, the eight pilot tones for each 242-tone dRU may be selected from the $7^{th}$, $(7+26)^{th}$ or $33^{rd}$, $(22+2*26)^{th}$ or $74^{th}$, $(22+3*26)^{th}$ or $100^{th}$, $(7+136)^{th}$ or $143^{rd}$, $(7+26+136)^{th}$ or $169^{th}$, $(22+2*26+136)^{th}$ or $210^{th}$ and $(22+3*26+136)^{th}$ or $236^{th}$ tones of a dRU242.

Figure 9:
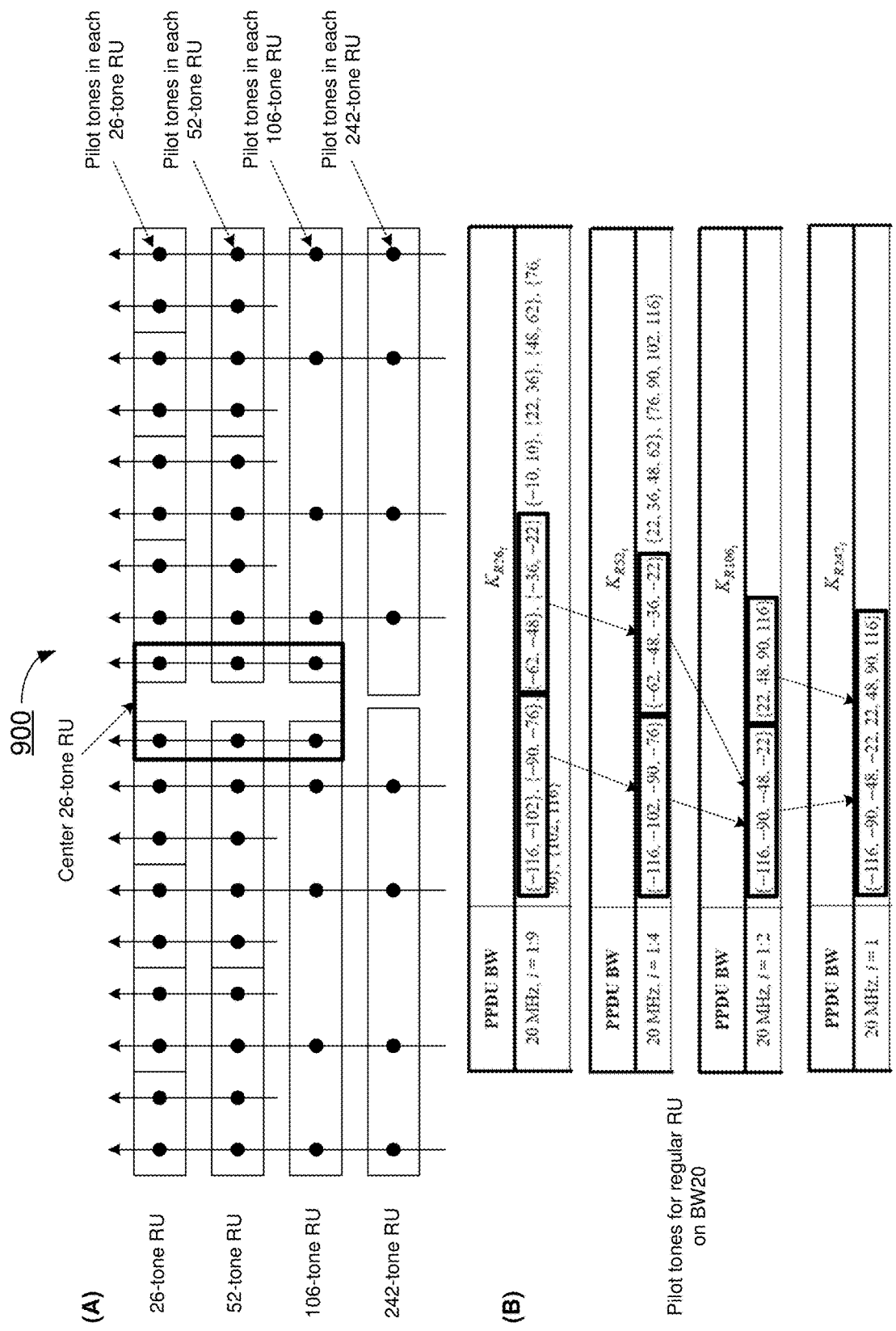
FIG. 9 is a diagram of an example design in accordance with an implementation of the present disclosure.

FIG. 9 illustrates an example design 900 of a hierarchical structure used in pilot tone designs for dRUs under a proposed scheme in accordance with the present disclosure. In part (A) of FIG. 9, pilot tones of each of a 26-tone rRU, a 52-tone rRU, a 106-tone rRU and a 242-tone rRU are shown as black dots and may be used as pilot tones for a 26-tone dRU, a 52-tone dRU, a 106-tone dRU and a 242-tone dRU. Part (B) of FIG. 9 shows indices of pilot tones of a rRU on BW20.

Under the proposed scheme, similar with the hierarchical structure of pilot tones for a rRU, the design rules regarding pilot tones for dRUs are listed below. Firstly, four pilot tones of a 52-tone dRU may include pilot tones from two corresponding 26-tone dRUs (e.g., with two pilot tones from each 26-tone dRU). For instance, four pilot tones of a 52-tone dRU1 may be built from two pilot tones from a 26-tone dRU1 and two pilot tones from a 26-tone dRU2 and the like. Secondly, four pilot tones of a 106-tone dRU may include pilot tones from two corresponding 52-tone dRUs (e.g., with two pilot tones from each 52-tone dRU). For instance, four pilot tones of a 106-tone dRU1 may be built from two pilot tones from a 52-tone dRU1 and two pilot tones from a 52-tone dRU2 and the like. Thirdly, eight pilot tones of a 242-tone dRU may include pilot tones from two corresponding 106-tone dRUs (e.g., with four pilot tones from each 106-tone dRU). For instance, eight pilot tones of a 242-tone dRU1 may be built from four pilot tones from a 106-tone dRU1 and four pilot tones from a 106-tone dRU2 and the like. Fourthly, sixteen pilot tones of a 484-tone dRU may include pilot tones from two corresponding 242-tone dRUs (e.g., with eight pilot tones from each 242-tone dRU). For instance, sixteen pilot tones of a 484-tone dRU1 may be built from eight pilot tones from a 242-tone dRU1 and eight pilot tones from a 242-tone dRU2 and the like.

Figure 10:
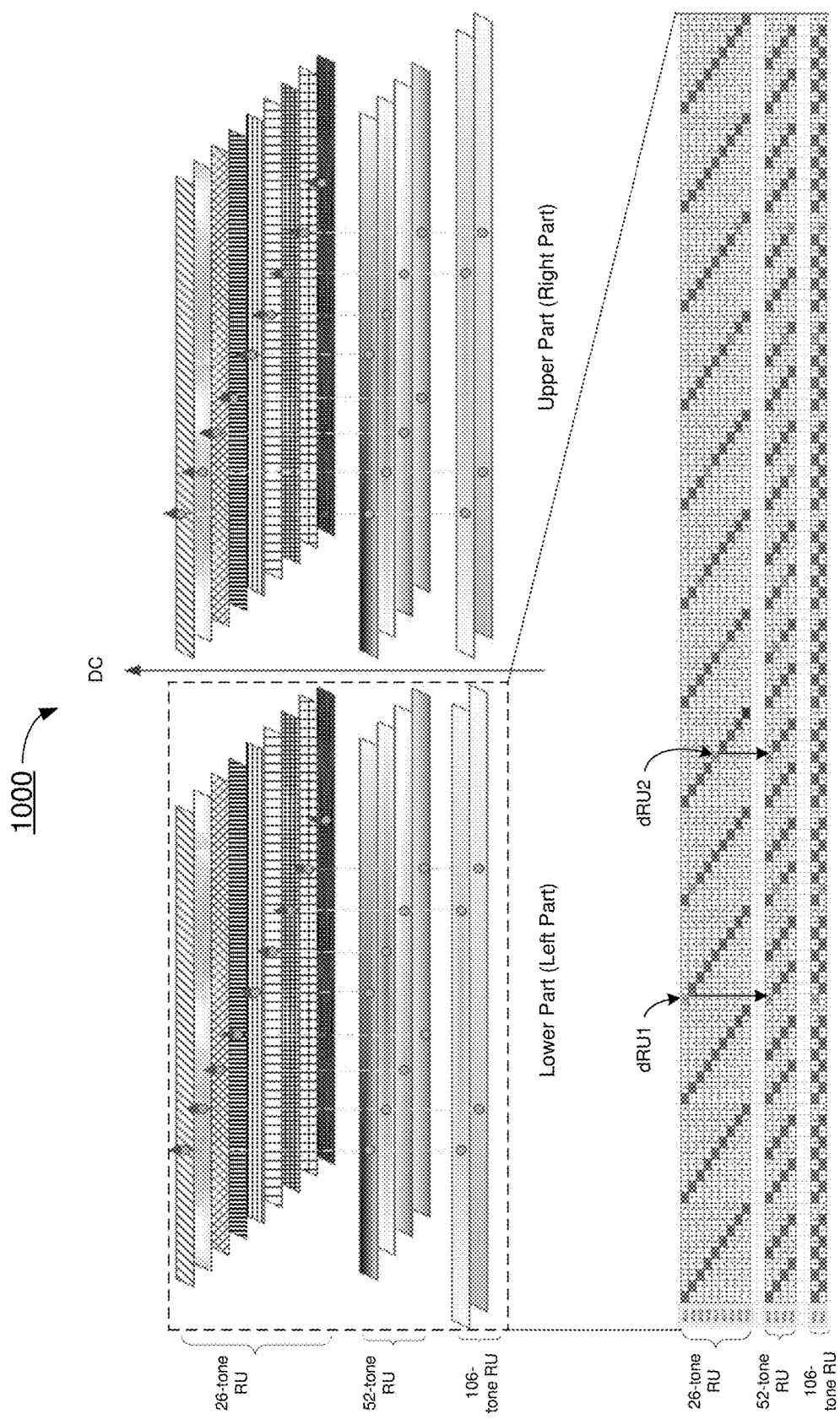
FIG. 10 is a diagram of an example design in accordance with an implementation of the present disclosure.

FIG. 10 illustrates an example design 1000 of a hierarchical structure-based pilot tone design for dRUs under a proposed scheme in accordance with the present disclosure. Design 1000 shows an alternative way of pilot tone assignment to maintain the hierarchical structure and achieve better pilot tone separation for dRUs (e.g., dRU26 and dRU52 and dRU106) to avoid the problem of dRU pilots are "squeezed in clusters" at receiver side.

Under a proposed scheme in accordance with the present disclosure, pilot tone values (or pilot values) for rRUs may be reused for dRU pilot tones. FIG. 11 illustrates an example design 1100 under the proposed scheme. Referring to FIG. 11, proposed pilot values for dRUs having two pilot tones, four pilot tones and eight pilot tones are shown. Additionally, FIG. 11 shows example pilot values for dMRUs with six pilot tones (e.g., dMRU(26+52) and dMRU(26+106)).

Under a proposed scheme in accordance with the present disclosure, pilot mapping for rRUs may be reused for dRU pilot mapping. FIG. 12, FIG. 13, FIG. 14 and FIG. 15 illustrate example designs 1200, 1300, 1400 and 1500 under the proposed scheme. Referring to FIG. 12, proposed pilot mappings for dRUs having two pilot tones and four pilot tones are shown. For instance, the proposed pilot mappings may be used for a 26-tone dRU with two pilot tones and a 52-tone dRU with four pilot tones, respectively. Referring to FIG. 13, proposed pilot mappings for dRUs having four pilot tones and eight pilot tones are shown. For instance, the proposed pilot mappings may be used for a 106-tone dRU with four pilot tones and a 242-tone dRU with eight pilot tones, respectively. Referring to FIG. 14, proposed pilot mappings for dRUs having sixteen pilot tones are shown. For instance, the proposed pilot mapping may be used for a 484-tone dRU with sixteen pilot tones. Referring to FIG. 15, proposed pilot mappings for dMRUs having six pilot tones are shown. For instance, the proposed pilot mappings may be used for a (26+52)-tone dMRU and a (26+106)-tone dMRU with six pilot tones.

Figure 16:
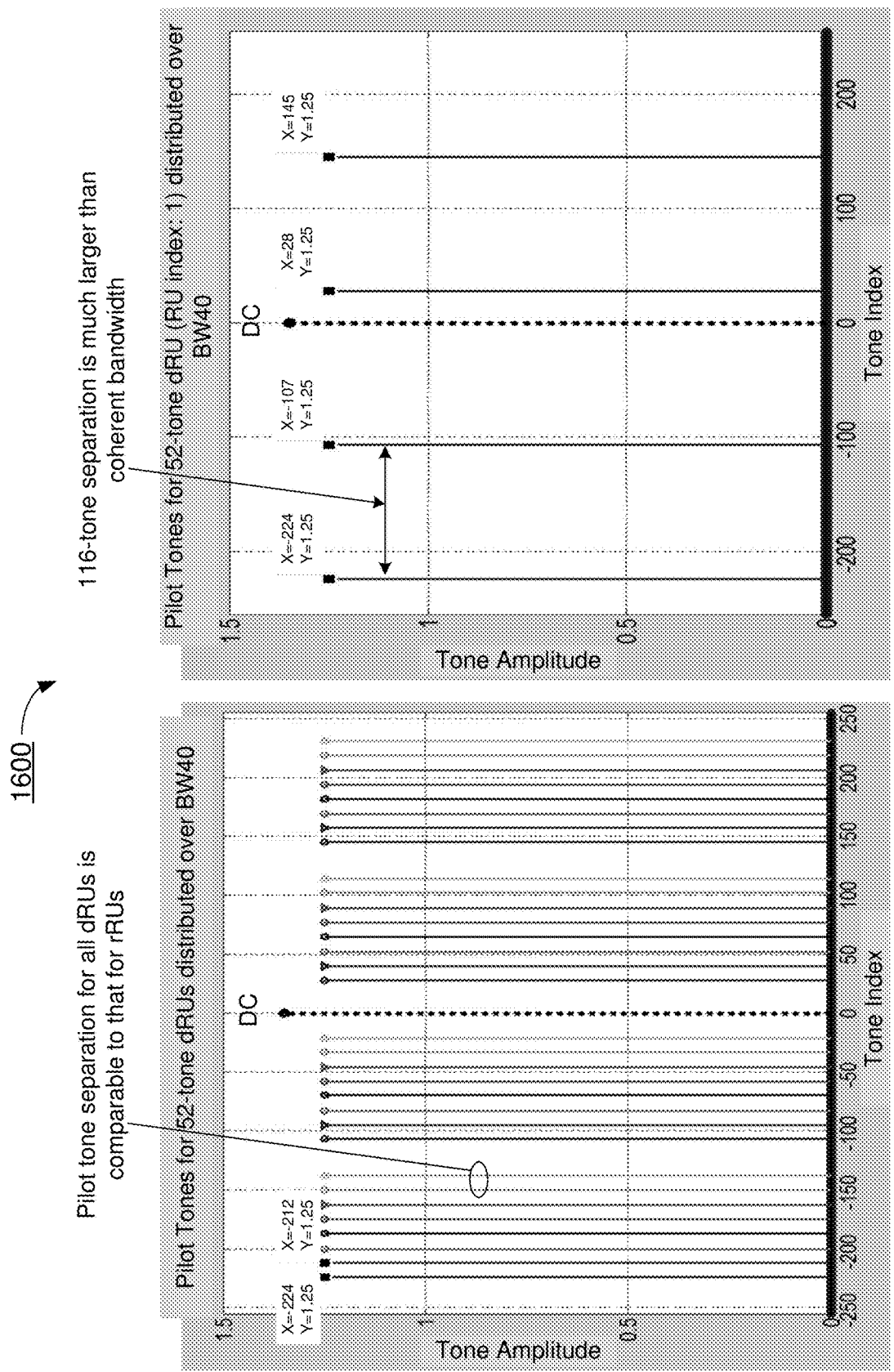
FIG. 16 is a diagram of an example scenario in accordance with an implementation of the present disclosure.

Under a proposed scheme in accordance with the present disclosure, there may be two options for pilot tone design for dRUs. FIG. 16 illustrates an example scenario 1600 under the proposed scheme. Under a first approach of Option 2 (Option 2A), pilot tone separations may be maximized for the overall dRUs to achieve near-evenly distribution of pilot tones. Under a second approach of Option 2 (Option 2B), perfect-evenly distribution of pilot tones may be achieved for dRU26 and near-evenly distribution of pilot tones may be achieved for dRUs of other sizes, with a sufficiently large overall pilot tone separations maintained to avoid narrowband interference (NBI) at AP receiver side. Both Option 2A and Option 2B may preserve the hierarchical structure of pilot tones used for rRUs. Under the proposed scheme, the pilot tones for a 26-tone dRU may be defined first and then pilot tones for dRUs of all other sizes may be generated from the pilot tones of the 26-tone dRU based on the hierarchical structure of pilot tones similar to that for rRUs. Under the proposed scheme, the first tone of each dRU may not be used for pilot tones, and the tones of each dRU next to the DC (DC tone) may not be used as pilot tones. Advantageously, the distance between pilot tones of each dRU may be much larger than the coherent bandwidth, as shown in FIG. 16, wherein X axis is tone index and Y axis is tone amplitude.

Figure 17:
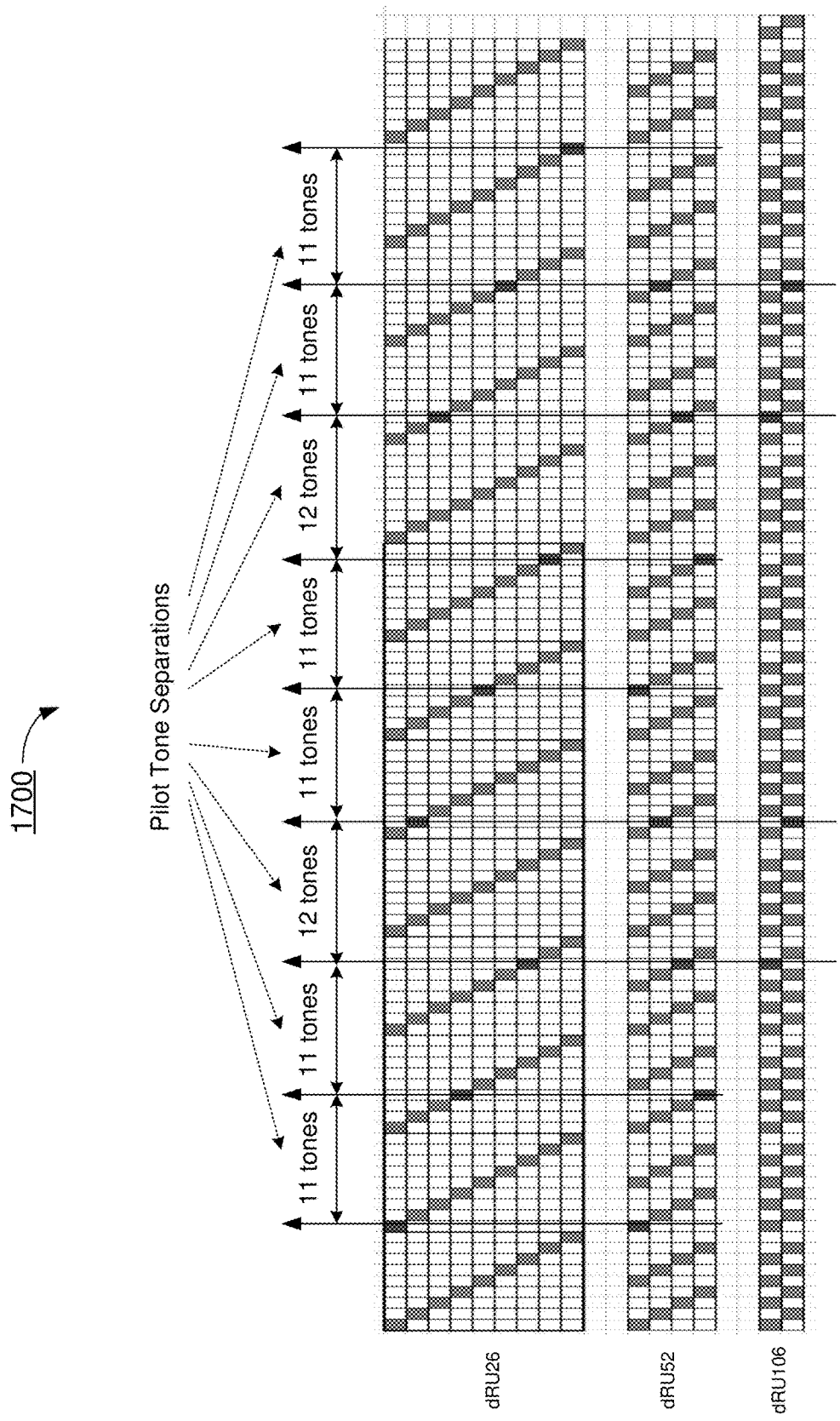
FIG. 17 is a diagram of an example scenario in accordance with an implementation of the present disclosure.
Figure 18:
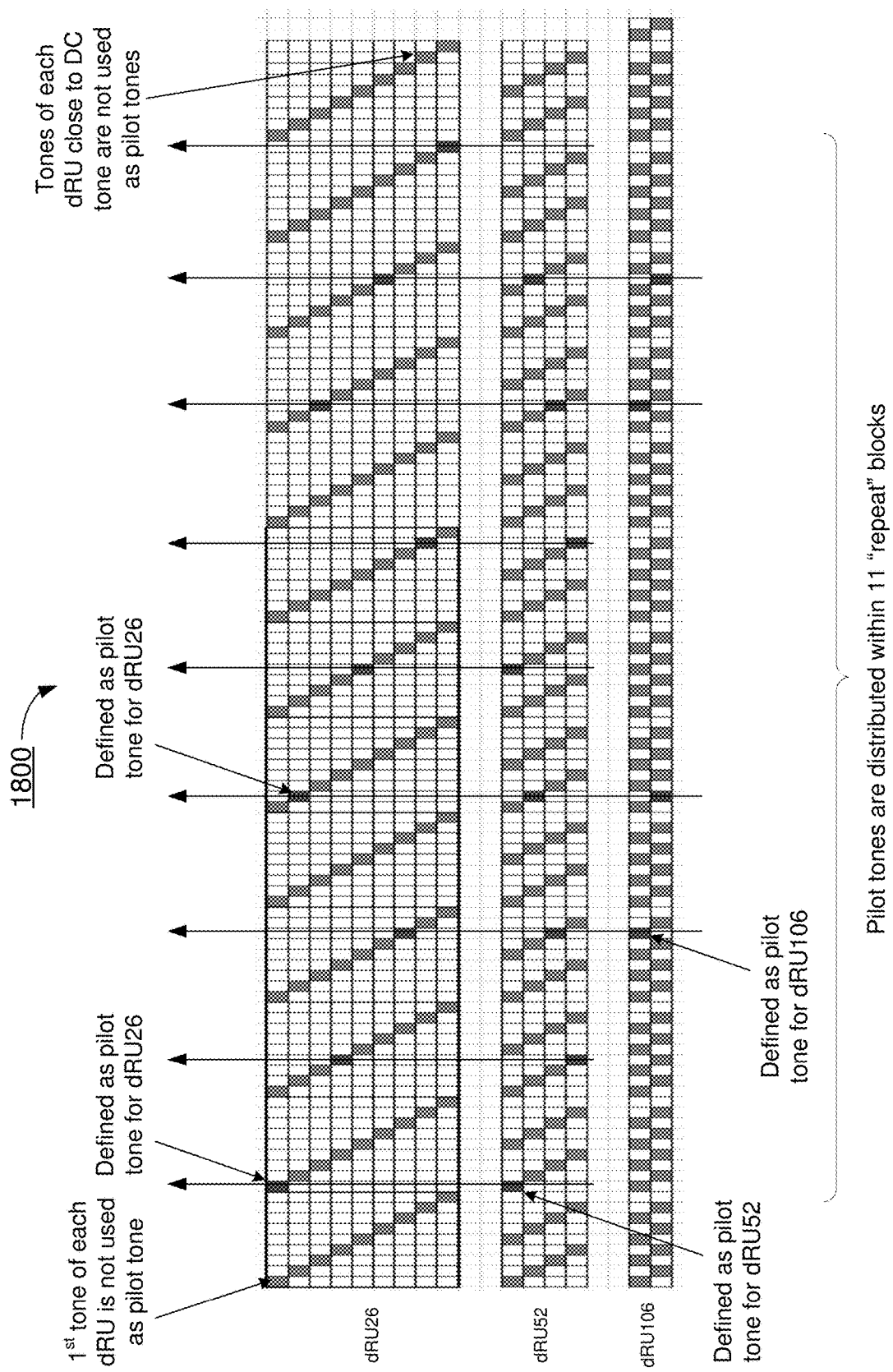
FIG. 18 is a diagram of an example scenario in accordance with an implementation of the present disclosure.

FIG. 17 illustrates an example scenario 1700 of pilot tone design for dRUs on BW20 under Option 2A. FIG. 18 illustrates an example scenario 1800 of pilot tone locations for dRUs on BW20 under Option 2A. It is noteworthy that each of scenario 1700 and scenario 1800 merely shows a half portion of tone distribution on BW20 (e.g., either the lower part or the upper part). As shown in FIG. 17 and FIG. 18, the pilot tones are near-evenly distributed over BW20 for dRU26, dRU52 and dRU106 to avoid the issue of pilot tones being squeezed in cluster(s). Also, there is a minimum distance between pilot tones (e.g., 11 tones or 12 tones) for overall pilot tones, which is comparable to that for rRUs. Referring to FIG. 18, the first tone of each dRU is not used as pilot tone, and the tones of each dRU close to the DC tone are not used as pilot tones. In the example shown in FIG. 18, the pilot tones are distributed within eleven "repeat" blocks.

Figure 19:
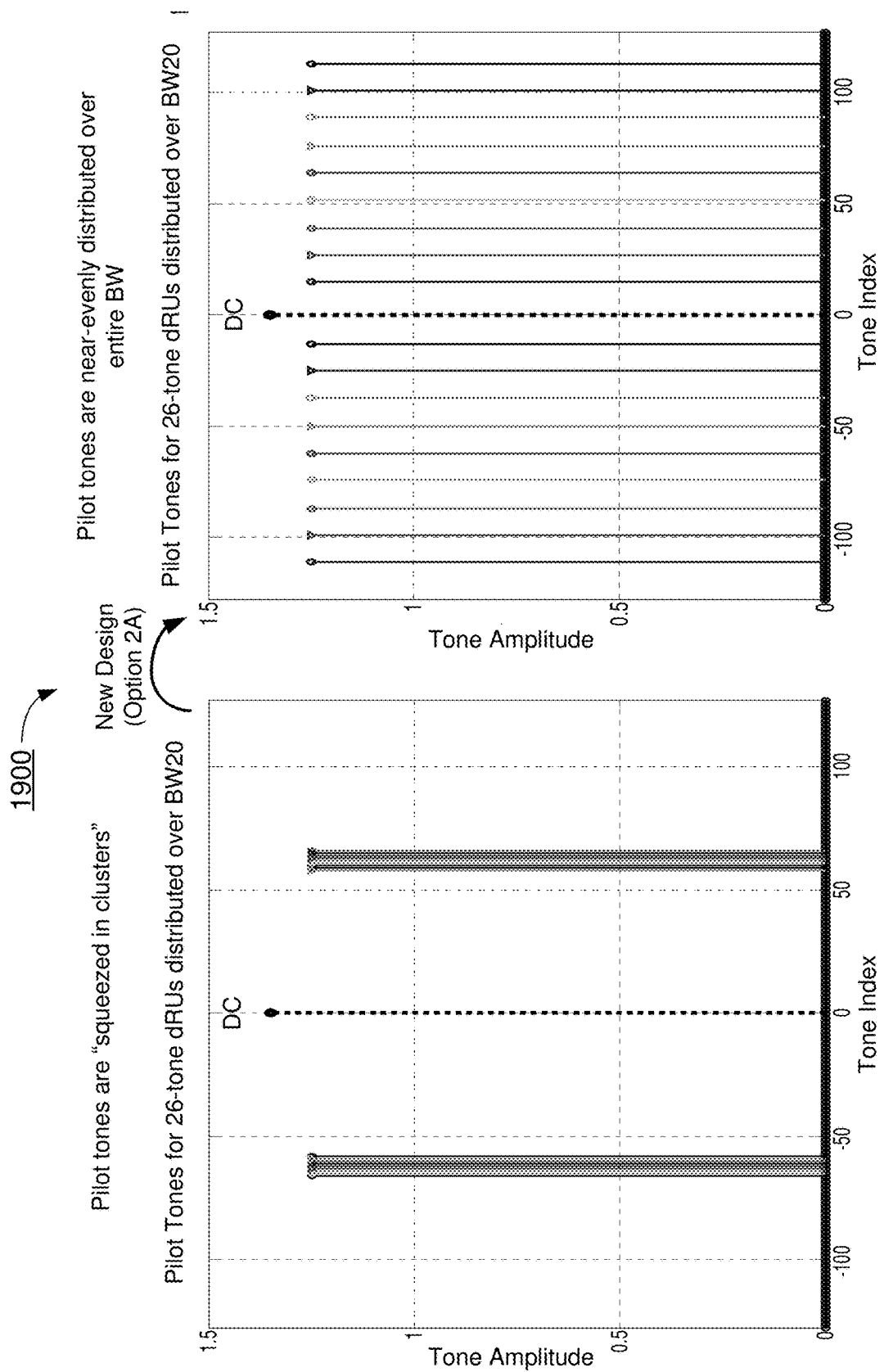
FIG. 19 is a diagram of an example scenario in accordance with an implementation of the present disclosure.

FIG. 19 illustrates an example scenario 1900 of pilot tone distribution for dRU26 on BW20 under Option 2A. As shown on the left side of FIG. 19, distribution of pilot tones of a 26-tone dRU without implementing the proposed scheme (Option 2A) may result in the pilot tones being squeezed in clusters (e.g., by using design Option 1). As shown on the right side of FIG. 19, pilot tones of a 26-tone dRU may be near-evenly distributed over an entire bandwidth of BW20 under Option 2A.

Figure 20:
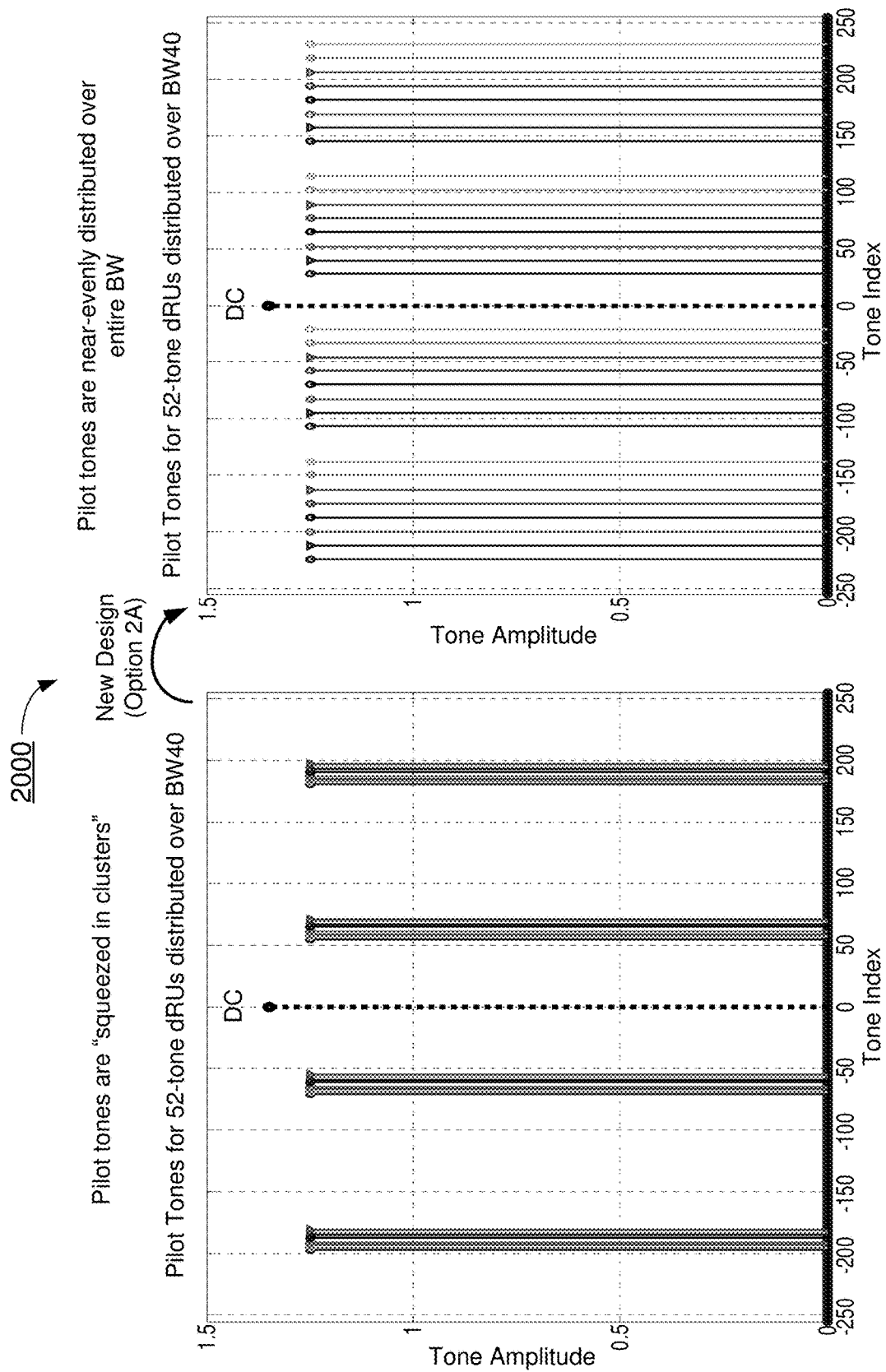
FIG. 20 is a diagram of an example scenario in accordance with an implementation of the present disclosure.
Figure 21:
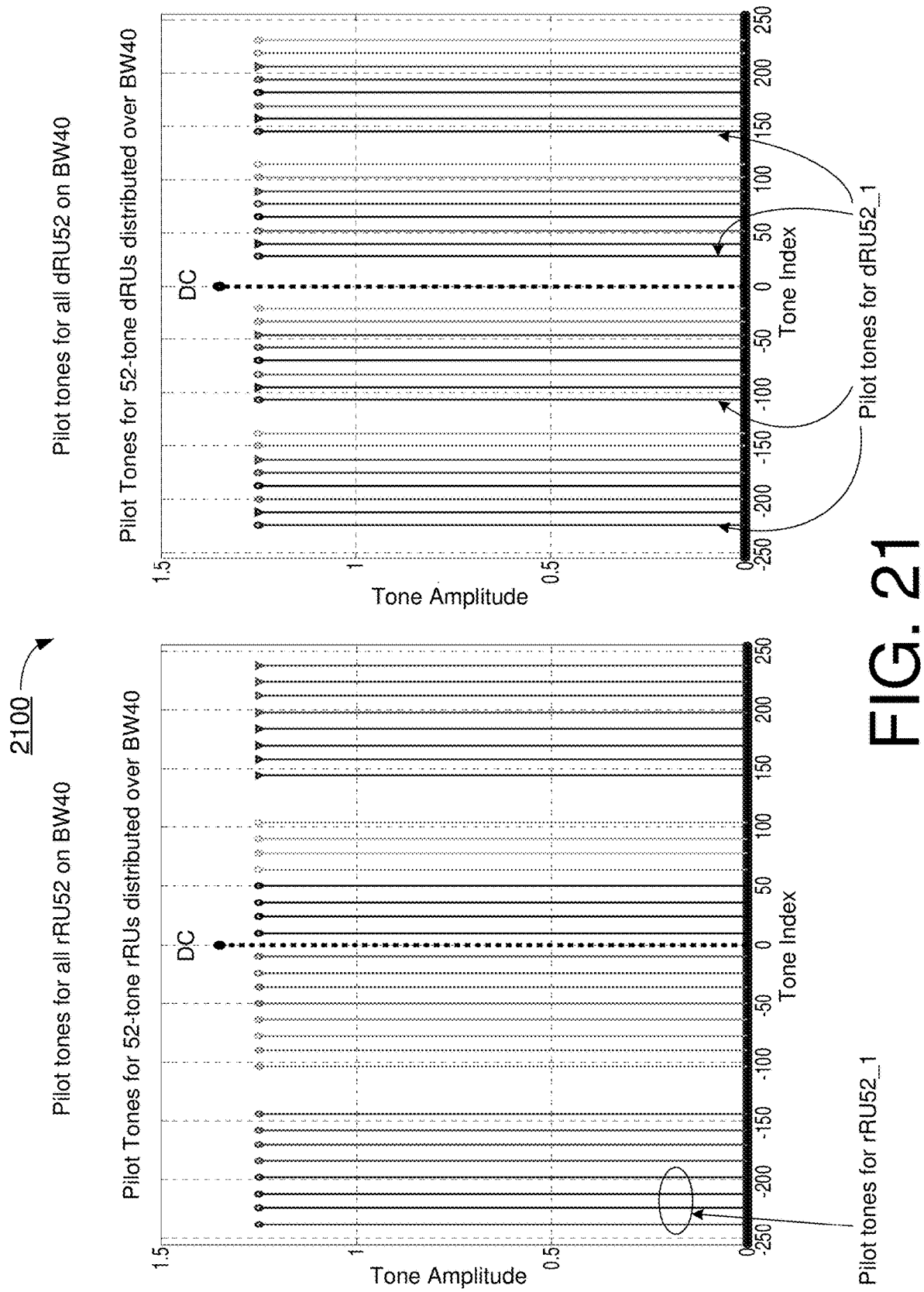
FIG. 21 is a diagram of an example scenario in accordance with an implementation of the present disclosure.

FIG. 20 illustrates an example scenario 2000 of pilot tone distribution for dRU52 on BW40 under Option 2A. As shown on the left side of FIG. 20, distribution of pilot tones of a 52-tone dRU without implementing the proposed scheme (Option 2A) may result in the pilot tones being squeezed in clusters (e.g., by using design Option 1). As shown on the right side of FIG. 20, pilot tones of a 52-tone dRU may be near-evenly distributed over an entire bandwidth of BW40 under Option 2A. FIG. 21 illustrates an example scenario 2100 of a comparison of pilot tones. In scenario 2100, pilot tones of a rRU52 on BW40 and pilot tones of a dRU52 on BW40 are compared. As can be seen, instead of being squeezed in a cluster for dRU pilot design Option1, similar to rRU52, the pilot tones of dRU52 are distributed near-evenly over the entire bandwidth of BW40 under Option 2A.

Figure 22:
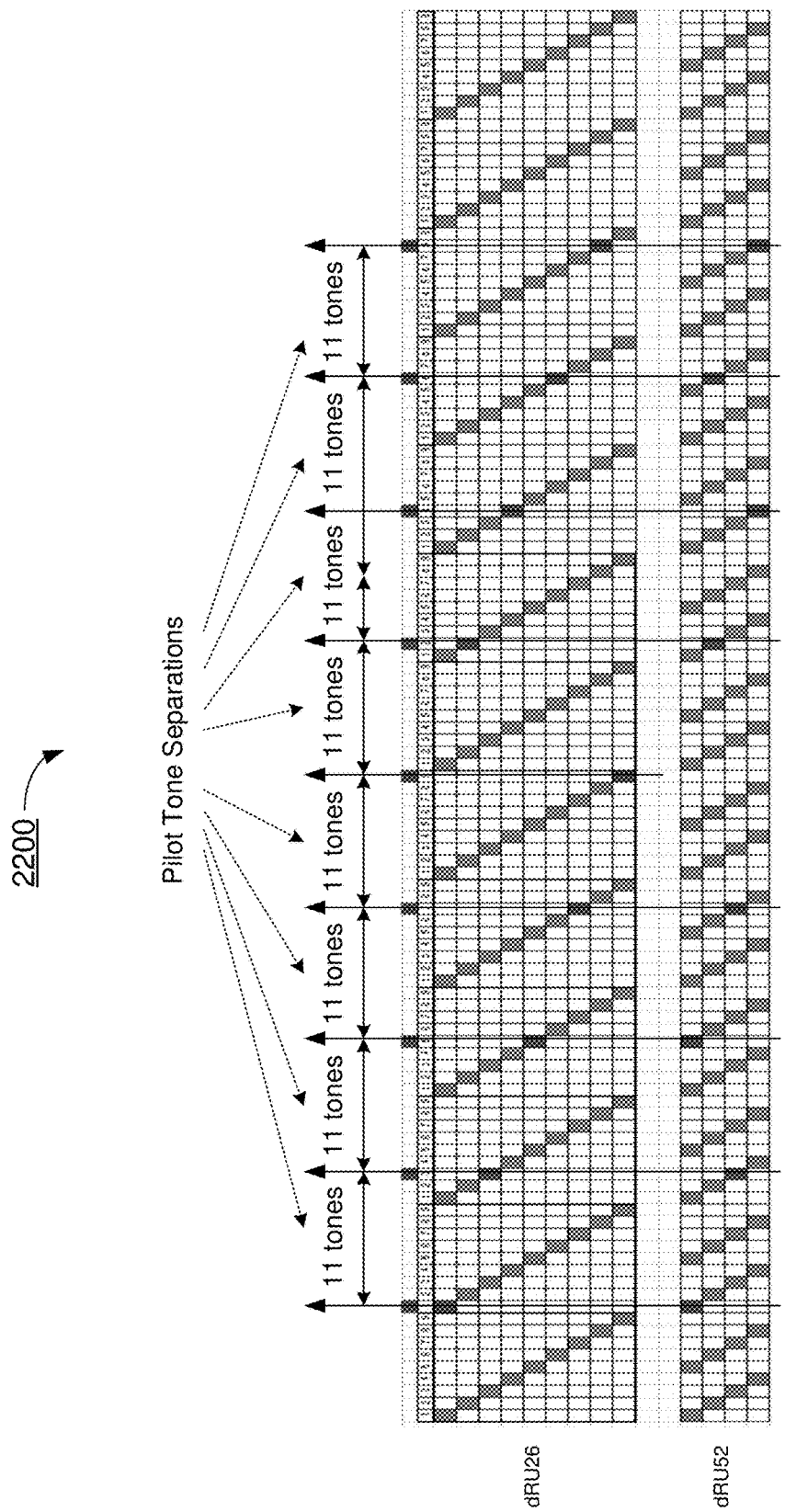
FIG. 22 is a diagram of an example scenario in accordance with an implementation of the present disclosure.

FIG. 22 illustrates an example scenario 2200 of pilot tone design for dRUs on BW20 under Option 2B. It is noteworthy that scenario 1700 merely shows a half portion of tone distribution on BW20 (e.g., either the lower part or the upper part). As shown in FIG. 22, the pilot tones are perfect-evenly distributed over BW20 for dRU26 and near-evenly distributed for dRUs of other sizes to maintain a sufficiently large overall pilot tone separation to avoid the issue of pilot tones being squeezed in cluster(s). Also, there is a minimum distance between pilot tones (e.g., 11) for overall pilot tones, which is comparable to that for rRUs. It is also noteworthy that the pilot tones for dRU26 under Option 2B may be selected based on "sub-sampling by 11" for 26-tone dRU.

Figure 23:
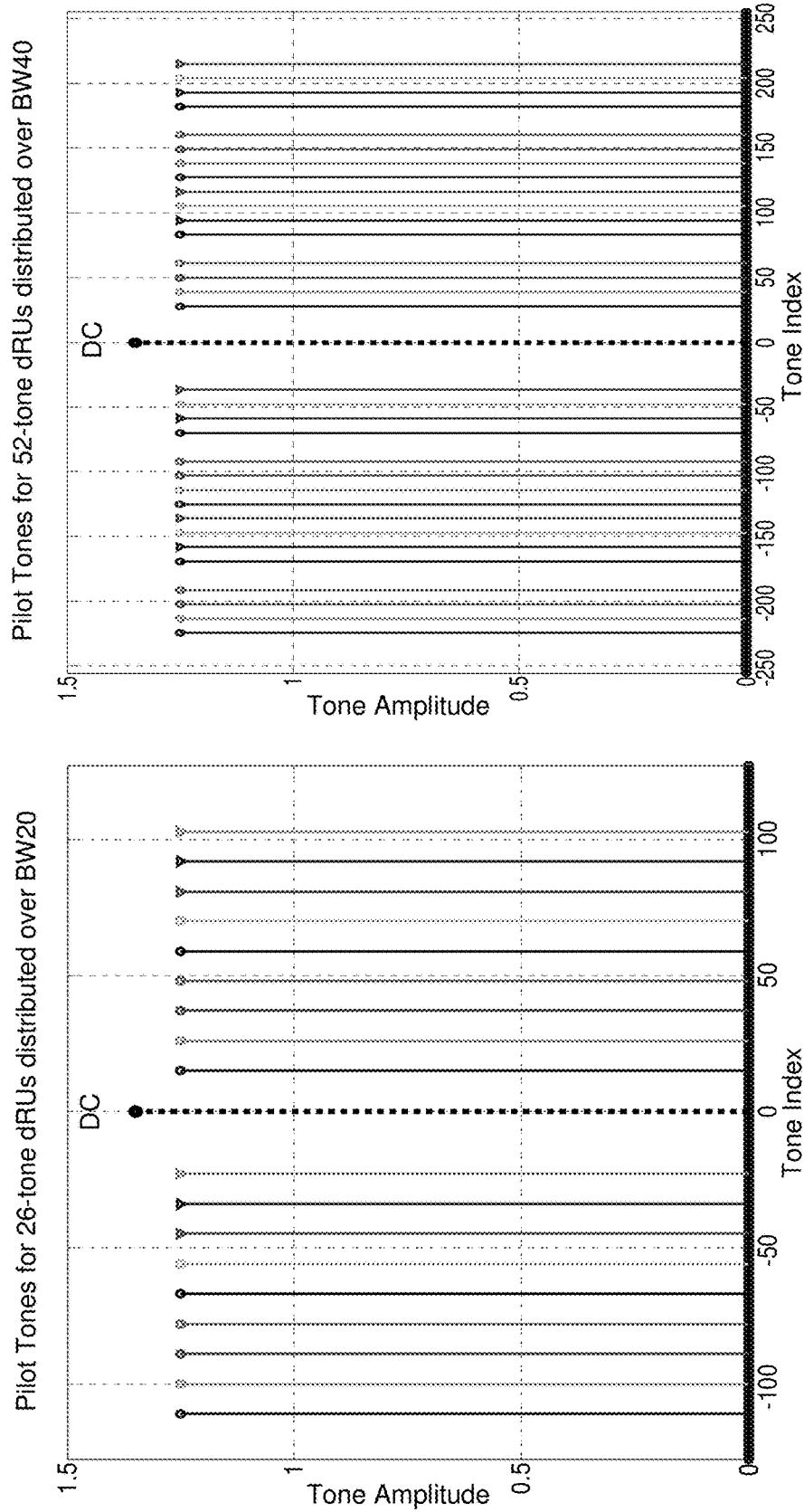
FIG. 23 is a diagram of an example scenario in accordance with an implementation of the present disclosure.
Figure 24:
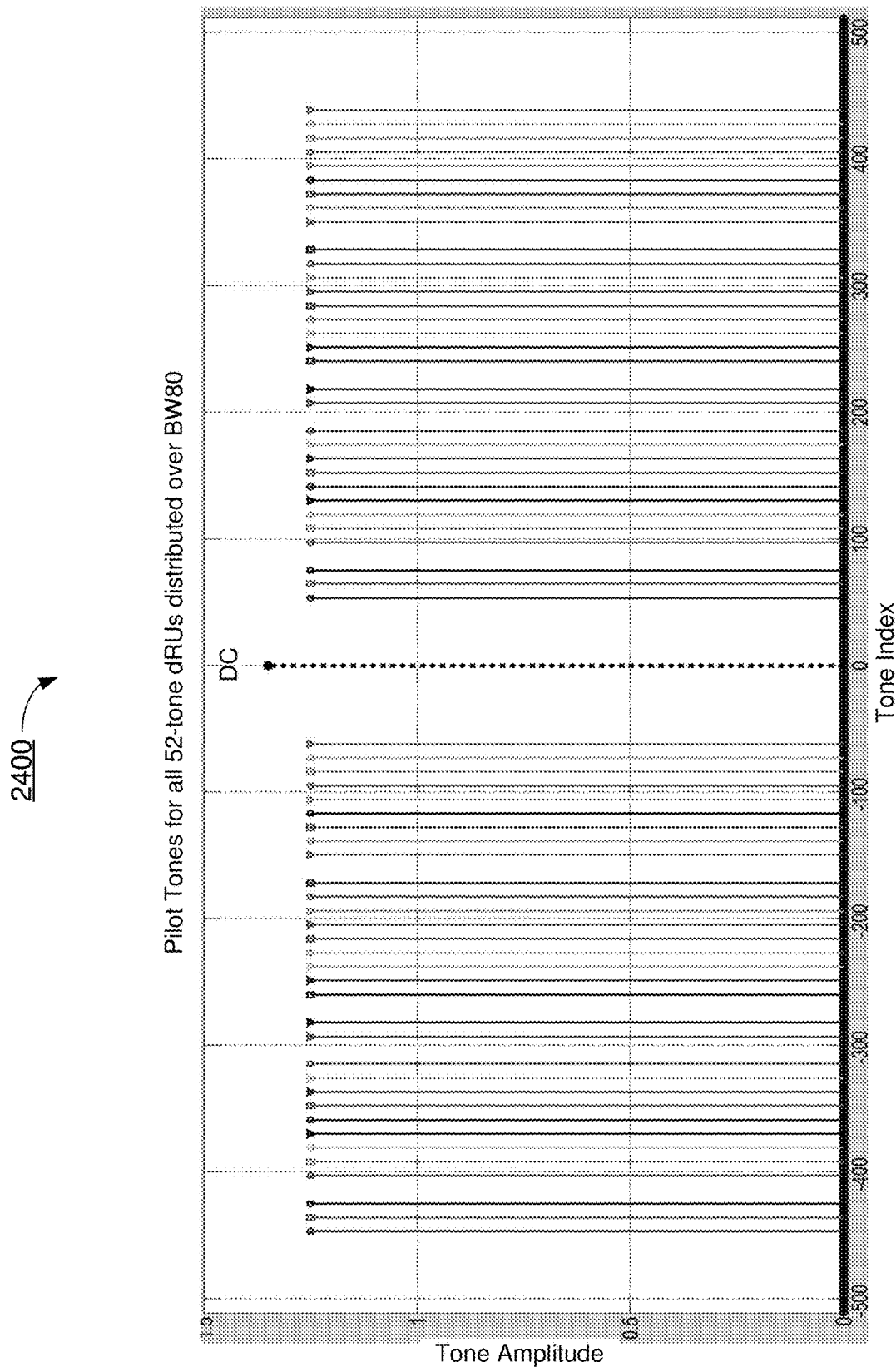
FIG. 24 is a diagram of an example scenario in accordance with an implementation of the present disclosure.

FIG. 23 illustrates an example scenario 2300 of pilot tone locations for dRU26 on BW20 and dRU52 on BW40 under Option 2B. Specifically, the left side of FIG. 23 shows pilot tones of a 26-tone dRU distributed over BW20 under Option 2B. The right side of FIG. 23 shows pilot tones of a 52-tone dRU distributed over BW40 under Option 2B. FIG. 24 illustrates an example scenario 2400 of pilot tone locations for dRU52 on BW80 under Option 2B.

FIG. 25 illustrates an example design 2500 of pilot tones for dRU26 and dRU52 on BW20, BW40 and BW80 under Option 2A. FIG. 26 illustrates an example design 2600 of pilot tones for dRU106, dRU242 and dRU484 on BW20, BW40 and BW80 under Option 2A. FIG. 27 illustrates an example of an alternative design 2700 of pilot tones for dRU26 and dRU52 on BW20, BW40 and BW80 under Option 2B. FIG. 28 illustrates an example of alternative design 2800 of pilot tones for dRU106, dRU242 and dRU484 on BW20, BW40 and BW80 under Option 2B.

Under a proposed scheme in accordance with the present disclosure, based on the dRU tone plan described above, dRU pilot tone indices may be defined by using a "relative pilot position"-based dRU pilot tone design under Option 1. FIG. 29 illustrates an example design 2900 of pilot tone indices for transmission of dRU26, dRU52 and dRU106 on BW20 and for transmission of dRU26, dRU52, dRU106 and dRU242 on BW40. FIG. 30 illustrates an example design 3000 of pilot tone indices for transmission of dRU26, dRU52, dRu106, dRU242 and dRU484 on BW80.

Figure 31:
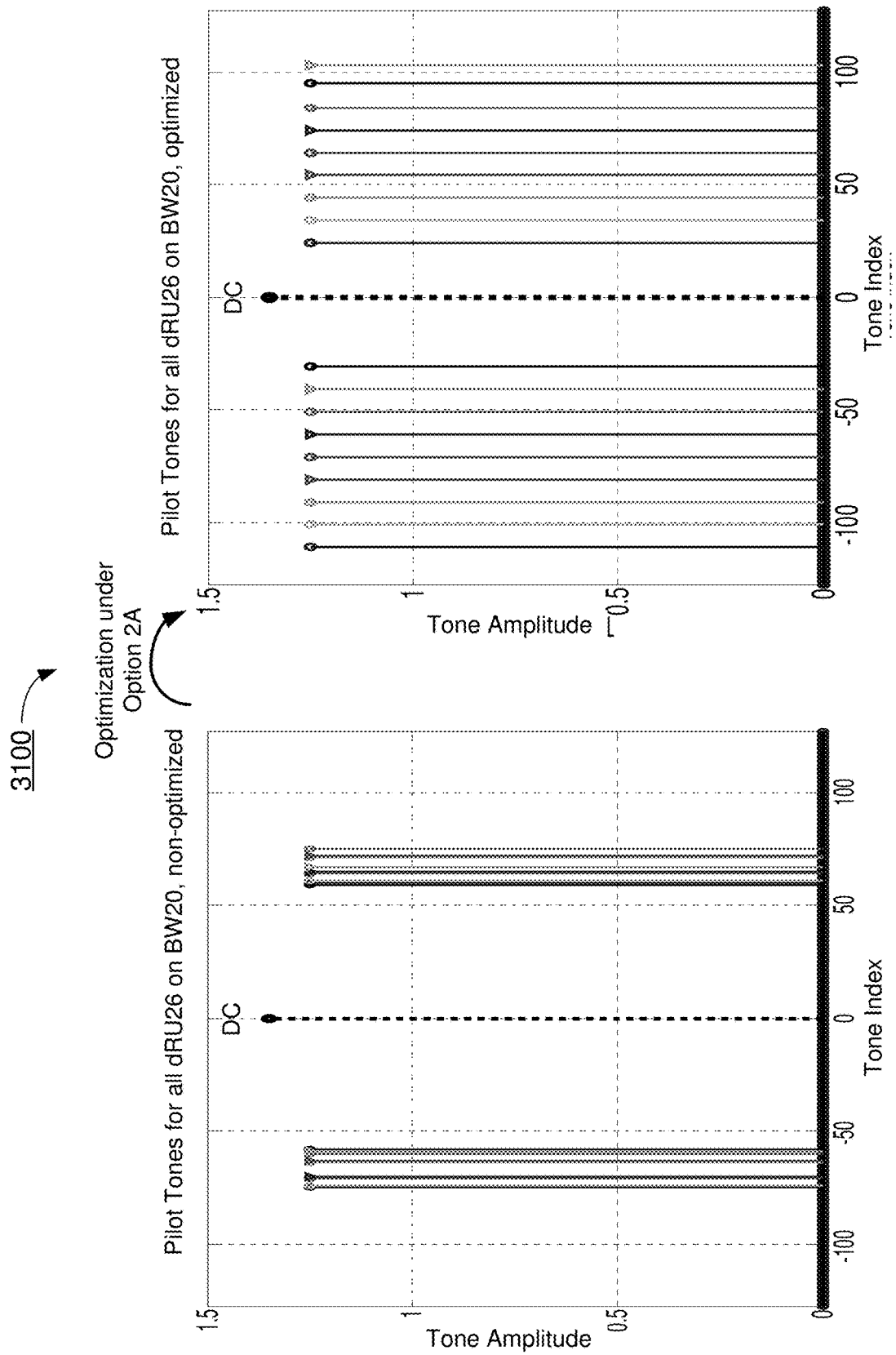
FIG. 31 is a diagram of an example scenario in accordance with an implementation of the present disclosure.

Under a proposed scheme in accordance with the present disclosure, dRU pilot tone design of Option 1 may be optimized by applying a shift or adjustment on relative pilot position(s) to avoid the issue of pilot tones being squeezed in cluster(s). The shift or adjustment on the relative pilot position(s) may be based on the starting index of each RU (herein interchangeably referred to as "$RU_{start}$"). For instance, the optimized relative position for dRU26 on BW20 may be generated by applying a per-RU shift based on $RU_{start}$ as follows: [7, 21]+$RU_{start}$(r)−4, where [7, 21] denotes the relative pilot positions of rRU26. FIG. 31 illustrates an example scenario 3100 of optimization of pilot tone design for dRU26 under Option 1 optimization of the proposed scheme.

FIG. 32 illustrates an example design 3200 of design parameters for dRU pilot tones on BW20, BW40 and BW80 under Option 1 optimization. In design 3200, regarding the dRU tone pattern repetition period (Np, in term of number of tones), Np=9 for BW20, Np=18 for BW80, and Np=36 for BW80. Under the proposed scheme, the parameter $RU_{start}$ represents the relative position of each dRU first tone index or the permutation of dRU starting tone index. The parameter $RU_{start}$ may be used to adjust pilot tone position for each dRU to avoid the issue of pilot tones being squeezed in cluster(s).

Under a proposed scheme in accordance with the present disclosure with respect to relative pilot position and $RU_{start}$ based dRU pilot tone design, relative pilot positions may include the following: (i) [7, 21] for all dRU26 on BW20 and BW40; (ii) [6, 20, 32, 46] for all dRU52 on BW20, BW40 and BW80; (iii) [6, 32, 74, 100] for all dRU106 on BW20, BW40 and BW80; (iv) [7, 33, 75, 101, 141, 167, 209, 235] for all dRU242 on BW40 and BW80; and (v) [7, 33, 75, 101, 141, 167, 209, 235, 250, 276, 318, 344, 384, 410, 452, 478] for all dRU484 on BW80. The relative pilot position vector may be denoted as $V_{rp}$, which may be used to define the optimized pilot tones for dRUs as follows: (i) $V_{rp}$=[7, 21] for dRU26; (ii) $V_{rp}$=[6, 20, 32, 46] for dRU52; (iii) $V_{rp}$=[6, 32, 74, 100] for dRU106; (iv) $V_{rp}$=[7, 33, 75, 101, 141, 167, 209, 235] for dRU242; and (v) $V_{rp}$=[7, 33, 75, 101, 141, 167, 209, 235, 250, 276, 318, 344, 384, 410, 452, 478] for dRU484. It is noteworthy that the alternative $V_{rp}$ may be used for the pilot tone design. For instance, $V_{rp}$=[6, 20] for dRU26; $V_{rp}$=[6, 20, 32, 46]+1 for dRU52; $V_{rp}$=[6, 32, 74, 100]+1 for dRU106; and $V_{rp}$=[7, 33, 75, 101, 141, 167, 209, 235]+1 for dRU242.

Figure 34:
FIG. 34 is a diagram of an example design in accordance with an implementation of the present disclosure.

Under the proposed scheme, the adjustment or shift may be performed on the relative pilot position $V_{rp}$ for each dRU to generate the adjusted or shifted relative pilot tone positions as $sV_{rp}$=$V_{rp}$+$S_{rp}$(r), where: (i) $S_{rp}$(r)=mod($RU_{start}$(r)+1, 9)−4 for dRU26 on BW40 and for dRU52 on BW80; (ii) $S_{rp}$(r)=$RU_{start}$(r)−4 for dRU26 on BW20, dRU52 on BW40 and dRU106 on BW80; (iii) $S_{rp}$(r)=($RU_{start}$(r)−1)*2 for dRU52 on BW20, dRU106 on BW40 and dRU242 on BW80; and (iv) $S_{rp}$(r)=$RU_{start}$(r)*4 for dRU106 on BW20, dRU242 on BW40 and dRU 484 on BW80. It is noteworthy that, for dRU26 on BW20 and r=9, $V_{rp}$=[7, 23]; for dRU26 on BW40 and r=5, $V_{rp}$=[6, 20]; and for dRU26 on BW80 and r=1, $V_{rp}$=[6, 20]. After the adjusted or shifted relative pilot position $sV_{rp}$ is generated or otherwise obtained, the pilot tones for each dRU may be generated as dRU($sV_{rp}$), where dRU denotes the subcarrier indices for dRU of each size on BW20/40/80. FIG. 33 illustrates an example design 3300 of optimized pilot tones for transmission of dRU26, dRU52 and dRU106 on BW20 and for transmission of dRU26, dRU52, dRU106 and dRU242 on BW40. FIG. 34 illustrates an example design 3400 of optimized pilot tones for transmission of dRU26, dRU52, dRu106, dRU242 and dRU484 on BW80.

Under a proposed scheme in accordance with the present disclosure, further optimization and updates for dRU pilot tone design may be implemented. As described above, a hierarchical structure-based pilot tone design may have certain properties. For instance, the pilot tone hierarchical structure is preserved and this guarantees sufficient separation of pilot tones for any combination of dRUs. Additionally, the pilot tones of dRU26 are used as the base set for dRUs of any other size. Moreover, the hierarchical structure-based pilot tone design may achieve evenly or near-evenly distributed pilot tones over an entire BW. Furthermore, hierarchical structure-based pilot tone design may guarantee that a minimum separation between pilot tones is comparable to that for rRU or better than rRU. Under the proposed scheme, the pilot tone assignments may be updated or further optimized by using the pilot tone designs shown in FIG. 35~FIG. 43.

FIG. 35 illustrates an example design 3500 of further optimized pilot tone design for dRU26, dRU52 and dRU106 on BW20 under a first approach and a second approach of Option 2. FIG. 36 illustrates an example design 3600 of further optimized pilot tone design for dRU26, dRU52, dRU106 and dRU242 on BW40 under a first approach and a second approach of Option 2. FIG. 37 illustrates an example design 3700 of further optimized pilot tone design for dRU26, dRU52, dRU106 and dRU242 on BW40 under a third approach and a fourth approach of Option 2. FIG. 38 illustrates an example design 3800 of further optimized pilot tone design for dRU26, dRU52, dRU106, dRU242 and dRU484 on BW80 under a first approach of Option 2. FIG. 39 illustrates an example design 3900 of further optimized pilot tone design for dRU26, dRU52, dRU106, dRU242 and dRU484 on BW80 under a second approach of Option 2. FIG. 40 illustrates an example design 4000 of further optimized pilot tone design for dRU26, dRU52, dRU106, dRU242 and dRU484 on BW80 under a third approach of Option 2. FIG. 41 illustrates an example design 4100 of further optimized pilot tone design for dRU52, dRU106, dRU242 and dRU484 on BW80 under a fourth approach of Option 2. FIG. 42 illustrates an example design 4200 of further optimized pilot tone design for dRU52, dRU106, dRU242 and dRU484 on BW80 under a fifth approach of Option 2. FIG. 43 illustrates an example design 4300 of further optimized pilot tone design for dRU52, dRU106, dRU242 and dRU484 on BW80 under a sixth approach of Option 2.

Illustrative Implementations

Figure 44:
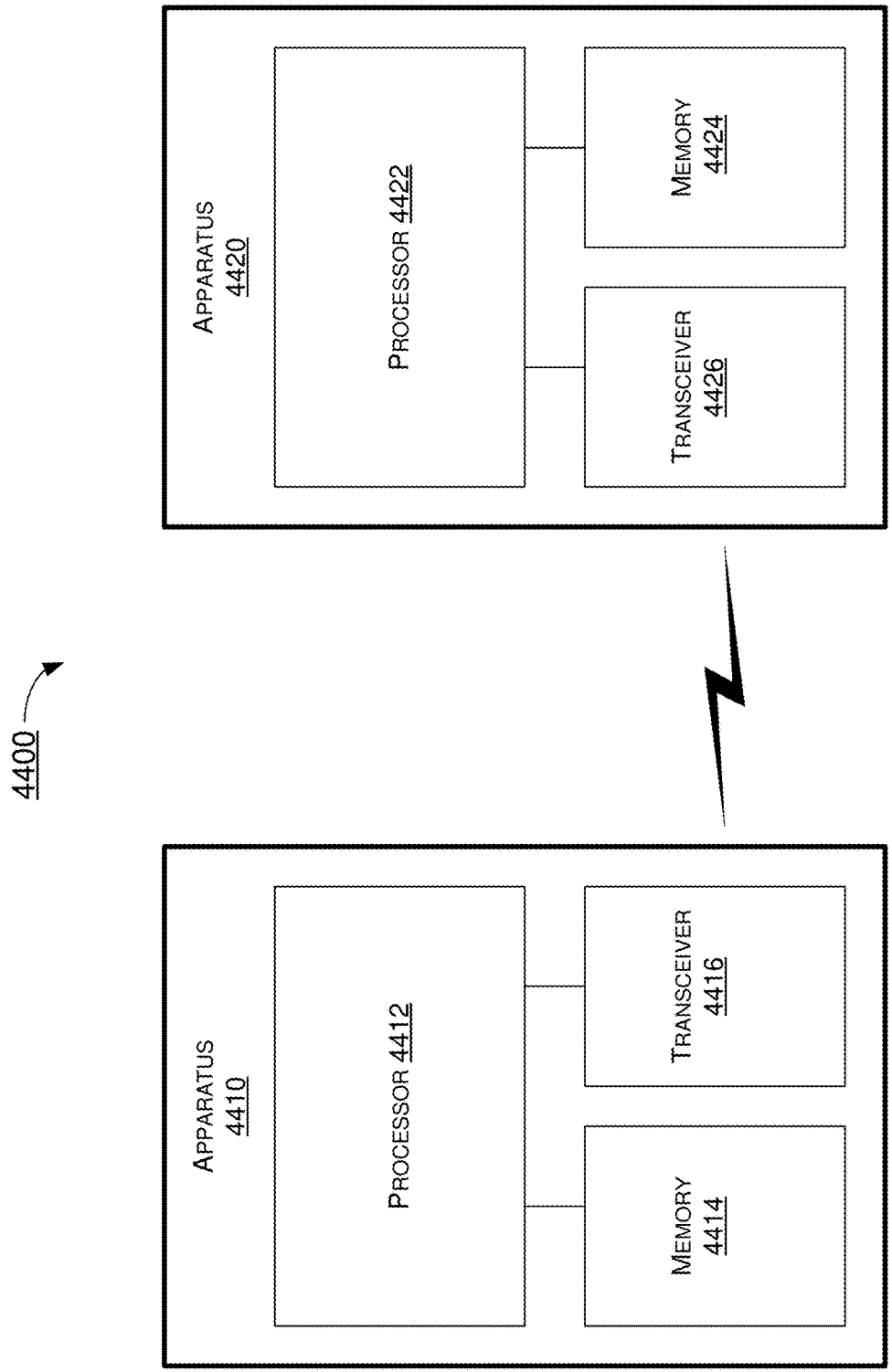
FIG. 44 is a block diagram of an example communication system in accordance with an implementation of the present disclosure.

FIG. 44 illustrates an example system 4400 having at least an example apparatus 4410 and an example apparatus 4420 in accordance with an implementation of the present disclosure. Each of apparatus 4410 and apparatus 4420 may perform various functions to implement schemes, techniques, processes and methods described herein pertaining to subcarrier indices for distributed-tone RUs (dRU) in 6 GHz LPI systems, including the various schemes described above with respect to various proposed designs, concepts, schemes, systems and methods described above as well as processes described below. For instance, apparatus 4410 may be an example implementation of communication entity 110, and apparatus 4420 may be an example implementation of communication entity 120.

Each of apparatus 4410 and apparatus 4420 may be a part of an electronic apparatus, which may be a STA or an AP, such as a portable or mobile apparatus, a wearable apparatus, a wireless communication apparatus or a computing apparatus. For instance, each of apparatus 4410 and apparatus 4420 may be implemented in a smartphone, a smart watch, a personal digital assistant, a digital camera, or a computing equipment such as a tablet computer, a laptop computer or a notebook computer. Each of apparatus 4410 and apparatus 4420 may also be a part of a machine type apparatus, which may be an IoT apparatus such as an immobile or a stationary apparatus, a home apparatus, a wire communication apparatus or a computing apparatus. For instance, each of apparatus 4410 and apparatus 4420 may be implemented in a smart thermostat, a smart fridge, a smart door lock, a wireless speaker or a home control center. When implemented in or as a network apparatus, apparatus 4410 and/or apparatus 4420 may be implemented in a network node, such as an AP in a WLAN.

In some implementations, each of apparatus 4410 and apparatus 4420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 4410 and apparatus 4420 may be implemented in or as a STA or an AP. Each of apparatus 4410 and apparatus 4420 may include at least some of those components shown in FIG. 44 such as a processor 4412 and a processor 4422, respectively, for example. Each of apparatus 4410 and apparatus 4420 may further include one or more other components not pertinent to the proposed scheme of the present disclosure (e.g., internal power supply, display device and/or user interface device), and, thus, such component(s) of apparatus 4410 and apparatus 4420 are neither shown in FIG. 44 nor described below in the interest of simplicity and brevity.

In one aspect, each of processor 4412 and processor 4422 may be implemented in the form of one or more single-core processors, one or more multi-core processors, one or more RISC processors or one or more CISC processors. That is, even though a singular term "a processor" is used herein to refer to processor 4412 and processor 4422, each of processor 4412 and processor 4422 may include multiple processors in some implementations and a single processor in other implementations in accordance with the present disclosure. In another aspect, each of processor 4412 and processor 4422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 4412 and processor 4422 is a special-purpose machine specifically designed, arranged and configured to perform specific tasks including those pertaining to pilot tone design for distributed-tone RUs in 6 GHz LPI systems in accordance with various implementations of the present disclosure. For instance, each of processor 4412 and processor 4422 may be configured with hardware components, or circuitry, implementing one, some or all of the examples described and illustrated herein.

In some implementations, apparatus 4410 may also include a transceiver 4416 coupled to processor 4412. Transceiver 4416 may be capable of wirelessly transmitting and receiving data. In some implementations, apparatus 4420 may also include a transceiver 4426 coupled to processor 4422. Transceiver 4426 may include a transceiver capable of wirelessly transmitting and receiving data.

In some implementations, apparatus 4410 may further include a memory 4414 coupled to processor 4412 and capable of being accessed by processor 4412 and storing data therein. In some implementations, apparatus 4420 may further include a memory 4424 coupled to processor 4422 and capable of being accessed by processor 4422 and storing data therein. Each of memory 4414 and memory 4424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 4414 and memory 4424 may include a type of read-only memory (ROM) such as mask ROM, programmable ROM (PROM), erasable programmable ROM (EPROM) and/or electrically erasable programmable ROM (EEPROM). Alternatively, or additionally, each of memory 4414 and memory 4424 may include a type of non-volatile random-access memory (NVRAM) such as flash memory, solid-state memory, ferroelectric RAM (FeRAM), magnetoresistive RAM (MRAM) and/or phase-change memory.

Each of apparatus 4410 and apparatus 4420 may be a communication entity capable of communicating with each other using various proposed schemes in accordance with the present disclosure. For illustrative purposes and without limitation, a description of capabilities of apparatus 4410, as communication entity 110, and apparatus 4420, as communication entity 120, is provided below. It is noteworthy that, although the example implementations described below are provided in the context of WLAN, the same may be implemented in other types of networks. Thus, although the following description of example implementations pertains to a scenario in which apparatus 4410 functions as a transmitting device and apparatus 4420 functions as a receiving device, the same is also applicable to another scenario in which apparatus 4410 functions as a receiving device and apparatus 4420 functions as a transmitting device.

Under a proposed scheme in accordance with the present disclosure with respect to pilot tone design for distributed-tone Rus (dRUs) in 6 GHz LPI systems, processor 4412 of apparatus 4410 may generate a plurality of pilot tones of a dRU (e.g., by distributing subcarriers of a RU) based on a hierarchical structure of pilot tones that is used for a rRU. Moreover, processor 4412 may communicate, via transceiver 4416, with apparatus 4420 using the dRU.

In some implementations, in generating the pilot tones of the dRU based on the hierarchical structure of pilot tones, processor 4412 may build a first dRU of a larger size with a first plurality of pilot tones by using a second plurality of pilot tones from two corresponding second dRUs of a smaller size.

In some implementations, in generating the pilot tones of the dRU based on the hierarchical structure of pilot tones, processor 4412 may generate a 52-tone dRU with four pilot tones of the 52-tone dRU comprising respective two pilot tones from each of two corresponding 26-tone dRUs.

In some implementations, in generating the pilot tones of the dRU based on the hierarchical structure of pilot tones, processor 4412 may generate a 106-tone dRU with four pilot tones of the 106-tone dRU comprising respective two pilot tones from each of two corresponding 52-tone dRUs.

In some implementations, in generating the pilot tones of the dRU based on the hierarchical structure of pilot tones, processor 4412 may generate a 242-tone dRU with eight pilot tones of the 242-tone dRU comprising respective four pilot tones from each of two corresponding 106-tone dRUs.

In some implementations, in generating the pilot tones of the dRU based on the hierarchical structure of pilot tones, processor 4412 may generate a 484-tone dRU with sixteen pilot tones of the 484-tone dRU comprising respective eight pilot tones from each of two corresponding 242-tone dRUs.

In some implementations, in generating the pilot tones of the dRU based on the hierarchical structure of pilot tones, processor 4412 may generate a 26-tone dRU with a separation of eleven tones between every two adjacent pilot tones in a distribution of a plurality of pilot tones of the 26-tone dRU.

In some implementations, in generating the pilot tones of the dRU based on the hierarchical structure of pilot tones, process 4500 may involve processor 4412 generating a 26-tone dRU over a 20 MHz, 40 MHz and 80 MHz bandwidth. In such cases, pilot tone indices of the 26-tone dRU over BW20 may include the following: {−111 15}, {−89 37}, {−100 26}, {−78 48}, {−67 59}, {−56 70}, {−34 92}, {−45 81}, {−23 103}. Pilot tone indices of the 26-tone dRU over BW40 may include the following: {−224 28}, {−125 127}, {−202 50}, {−103 149}, {−81 171}, {−114 138}, {−213 39}, {−92 160}, {−191 61}, {−169 83}, {−70 182}, {−147 105}, {−48 204}, {−180 72}, {−59 193}, {−158 94}, {−37 215}, {−136 116}. Pilot tone indices of the 26-tone dRU over BW80 may include the following: {−447 53}, {−359 141}, {−403 97}, {−315 185}, {−271 229}, {−227 273}, {−139 361}, {−183 317}, {−95 405}, {−117 383}, {−425 75}, {−73 427}, {−381 119}, {−161 339}, {−337 163}, {−249 251}, {−293 207}, {−205 295}, {−194 306}, {−106 394}, {−150 350}, {−62 438}, {−414 86}, {−370 130}, {−282 218}, {−326 174}, {−238 262}, {−260 240}, {−172 328}, {−216 284}, {−128 372}, {−304 196}, {−84 416}, {−392 108}, {−436 64}, {−348 152}.

In some implementations, in generating the pilot tones of the dRU based on the hierarchical structure of pilot tones, process 4500 may involve processor 4412 generating a 52-tone dRU over a 20 MHz, 40 MHz, and 80 MHz bandwidth. In such cases, pilot tone indices of the 52-tone dRU over BW20 may include the following: {−111 −89 15 37}, {−100 −78 26 48}, {−56 −34 70 92}, {−45 −23 81 103}. Pilot tone indices of the 52-tone dRU over BW40 may include the following: {−224 −125 28 127}, {−202 −103 50 149}, {−213 −114 39 138}, {−191 −92 61 160}, {−169 −70 83 182}, {−147 −48 105 204}, {−158 −59 94 193}, {−136 −37 116 215}. Pilot tone indices of the 52-tone dRU over BW80 may include the following: {−447 −359 53 141}, {−403 −315 97 185}, {−227 −139 273 361}, {−183 −95 317 405}, {−425 −117 75 383}, {−381 −73 119 427}, {−337 −249 163 251}, {−293 −205 207 295}, {−194 −106 306 394}, {−150 −62 350 438}, {−370 −282 130 218}, {−326 −238 174 262}, {−260 −172 240 328}, {−216 −128 284 372}, {−392 −84 108 416}, {−436 −348 64 152}.

In some implementations, in generating the pilot tones of the dRU based on the hierarchical structure of pilot tones, process 4500 may involve processor 4412 generating a 106-tone dRU over a 20 MHz, 40 MHz, and 80 MHz bandwidth. In such cases, pilot tone indices of the 106-tone dRU over BW20 may include the following: {−111 −78 15 48}, {−56 −23 70 103}. Pilot tone indices of the 106-tone dRU over BW40 may include the following: {−224 −125 28 127}, {−191 −92 61 160}, {−169 −70 83 182}, {−136 −37 116 215}. Pilot tone indices of the 106-tone dRU over BW80 may include the following: {−447 −359 53 141}, {−227 −139 273 361}, {−425 −117 75 383}, {−337 −249 163 251}, {−194 −106 306 394}, {−370 −282 130 218}, {−260 −172 240 328}, {−392 −84 108 416}.

In some implementations, in generating the pilot tones of the dRU based on the hierarchical structure of pilot tones, process 4500 may involve processor 4412 generating a 242-tone dRU over a 40 MHz, and 80 MHz bandwidth. In such cases, pilot tone indices of the 242-tone dRU over BW40 may include the following: {−224 −191 −125 −92 28 61 127 160}, {−169 −136 −70 −37 83 116 182 215}. Pilot tone indices of the 242-tone dRU over BW80 may include the following: {−447 −359 −227 −139 53 141 273 361}, {−425 −337 −249 −117 75 163 251 383}, {−370 −282 −194 −106 130 218 306 394}, {−392 −260 −172 −84 108 240 328 416}.

In some implementations, in generating the pilot tones of the dRU based on the hierarchical structure of pilot tones, process 4500 may involve processor 4412 generating a 484-tone dRU over a 80 MHz bandwidth. In such cases, pilot tone indices of the 484-tone dRU over BW80 may include the following: {−447 −425 −359 −337 −249 −227 −139 −117 53 75 141 163 251 273 361 383}, {−392 −370 −282 −260 −194 −172 −106 −84 108 130 218 240 306 328 394 416}.

In some implementations, a distribution of the plurality of pilot tones of the dRU may be symmetric to a DC tone along an axis of subcarrier indices.

Illustrative Processes

Figure 45:
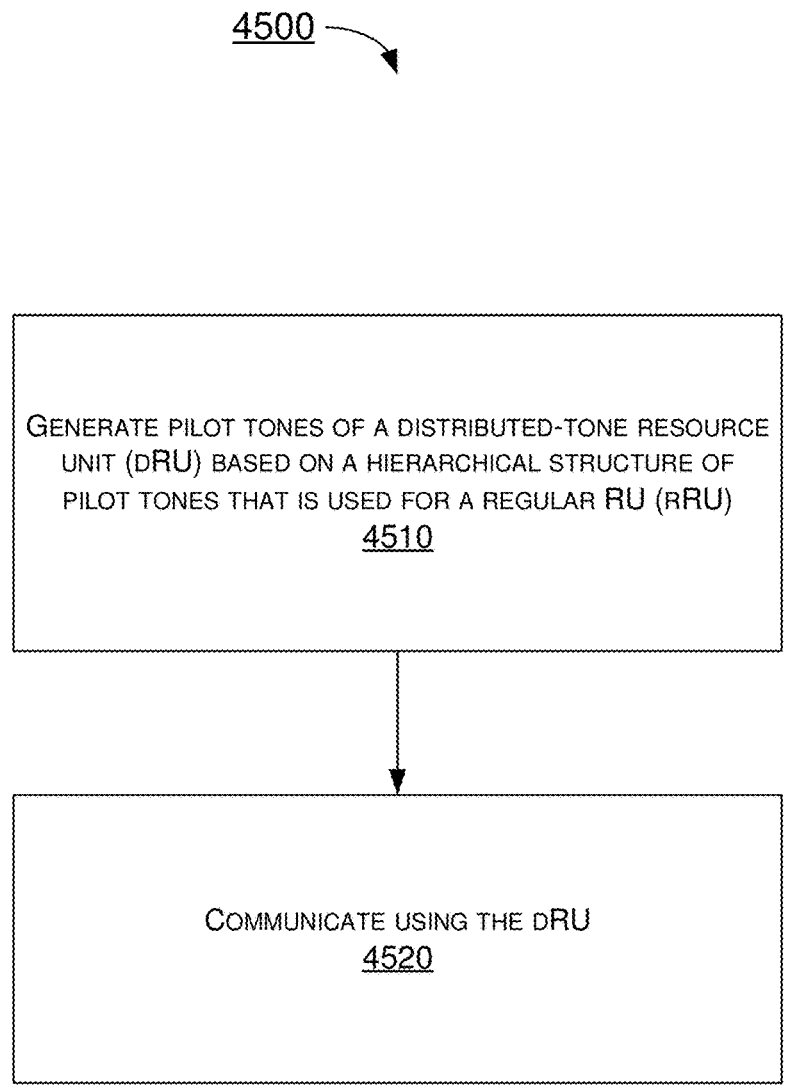
FIG. 45 is a flowchart of an example process in accordance with an implementation of the present disclosure.

FIG. 45 illustrates an example process 4500 in accordance with an implementation of the present disclosure. Process 4500 may represent an aspect of implementing various proposed designs, concepts, schemes, systems and methods described above. More specifically, process 4500 may represent an aspect of the proposed concepts and schemes pertaining to pilot tone design for distributed-tone RUs in 6 GHz LPI systems in accordance with the present disclosure. Process 4500 may include one or more operations, actions, or functions as illustrated by one or more of blocks 4510 and 4520. Although illustrated as discrete blocks, various blocks of process 4500 may be divided into additional blocks, combined into fewer blocks, or eliminated, depending on the desired implementation. Moreover, the blocks/sub-blocks of process 4500 may be executed in the order shown in FIG. 45 or, alternatively in a different order. Furthermore, one or more of the blocks/sub-blocks of process 4500 may be executed repeatedly or iteratively. Process 4500 may be implemented by or in apparatus 4410 and apparatus 4420 as well as any variations thereof. Solely for illustrative purposes and without limiting the scope, process 4500 is described below in the context of apparatus 4410 as communication entity 110 (e.g., a transmitting device whether a STA or an AP) and apparatus 4420 as communication entity 120 (e.g., a receiving device whether a STA or an AP) of a wireless network such as a WLAN in accordance with one or more of IEEE 802.11 standards. Process 4500 may begin at block 4510.

At 4510, process 4500 may involve processor 4412 of apparatus 4410 generating a plurality of pilot tones of a dRU (e.g., by distributing subcarriers of a RU) based on a hierarchical structure of pilot tones that is used for a rRU. Process 4500 may proceed from 4510 to 4520.

At 4520, process 4500 may involve processor 4412 communicating, via transceiver 4416, with apparatus 4420 using the dRU.

In some implementations, in generating the pilot tones of the dRU based on the hierarchical structure of pilot tones, process 4500 may involve processor 4412 building a first dRU of a larger size with a first plurality of pilot tones by using a second plurality of pilot tones from two corresponding second dRUs of a smaller size.

In some implementations, in generating the pilot tones of the dRU based on the hierarchical structure of pilot tones, process 4500 may involve processor 4412 generating a 52-tone dRU with four pilot tones of the 52-tone dRU comprising respective two pilot tones from each of two corresponding 26-tone dRUs.

In some implementations, in generating the pilot tones of the dRU based on the hierarchical structure of pilot tones, process 4500 may involve processor 4412 generating a 106-tone dRU with four pilot tones of the 106-tone dRU comprising respective two pilot tones from each of two corresponding 52-tone dRUs.

In some implementations, in generating the pilot tones of the dRU based on the hierarchical structure of pilot tones, process 4500 may involve processor 4412 generating a 242-tone dRU with eight pilot tones of the 242-tone dRU comprising respective four pilot tones from each of two corresponding 106-tone dRUs.

In some implementations, in generating the pilot tones of the dRU based on the hierarchical structure of pilot tones, process 4500 may involve processor 4412 generating a 484-tone dRU with sixteen pilot tones of the 484-tone dRU comprising respective eight pilot tones from each of two corresponding 242-tone dRUs.

In some implementations, in generating the pilot tones of the dRU based on the hierarchical structure of pilot tones, process 4500 may involve processor 4412 generating a 26-tone dRU with a separation of eleven tones between every two adjacent pilot tones in a distribution of a plurality of pilot tones of the 26-tone dRU.

In some implementations, in generating the pilot tones of the dRU based on the hierarchical structure of pilot tones, process 4500 may involve processor 4412 generating a 26-tone dRU over a 20 MHz, 40 MHz and 80 MHz bandwidth. In such cases, pilot tone indices of the 26-tone dRU over BW20 may include the following: {−111 15}, {−89 37}, {−100 26}, {−78 48}, {−67 59}, {−56 70}, {−34 92}, {−45 81}, {−23 103}. Pilot tone indices of the 26-tone dRU over BW40 may include the following: {−224 28}, {−125 127}, {−202 50}, {−103 149}, {−81 171}, {−114 138}, {−213 39}, {−92 160}, {−191 61}, {−169 83}, {−70 182}, {−147 105}, {−48 204}, {−180 72}, {−59 193}, {−158 94}, {−37 215}, {−136 116}. Pilot tone indices of the 26-tone dRU over BW80 may include the following: {−447 53}, {−359 141}, {−403 97}, {−315 185}, {−271 229}, {−227 273}, {−139 361}, {−183 317}, {−95 405}, {−117 383}, {−425 75}, {−73 427}, {−381 119}, {−161 339}, {−337 163}, {−249 251}, {−293 207}, {−205 295}, {−194 306}, {−106 394}, {−150 350}, {−62 438}, {−414 86}, {−370 130}, {−282 218}, {−326 174}, {−238 262}, {−260 240}, {−172 328}, {−216 284}, {−128 372}, {−304 196}, {−84 416}, {−392 108}, {−436 64}, {−348 152}.

In some implementations, in generating the pilot tones of the dRU based on the hierarchical structure of pilot tones, process 4500 may involve processor 4412 generating a 52-tone dRU over a 20 MHz, 40 MHz, and 80 MHz bandwidth. In such cases, pilot tone indices of the 52-tone dRU over BW20 may include the following: {−111 −89 15 37}, {−100 −78 26 48}, {−56 −34 70 92}, {−45 −23 81 103}. Pilot tone indices of the 52-tone dRU over BW40 may include the following: {−224 −125 28 127}, {−202 −103 50 149}, {−213 −114 39 138}, {−191 −92 61 160}, {−169 −70 83 182}, {−147 −48 105 204}, {−158 −59 94 193}, {−136 −37 116 215}. Pilot tone indices of the 52-tone dRU over BW80 may include the following: {−447 −359 53 141}, {−403 −315 97 185}, {−227 −139 273 361}, {−183 −95 317 405}, {−425 −117 75 383}, {−381 −73 119 427}, {−337 −249 163 251}, {−293 −205 207 295}, {−194 −106 306 394}, {−150 −62 350 438}, {−370 −282 130 218}, {−326 −238 174 262}, {−260 −172 240 328}, {−216 −128 284 372}, {−392 −84 108 416}, {−436 −348 64 152}.

In some implementations, in generating the pilot tones of the dRU based on the hierarchical structure of pilot tones, process 4500 may involve processor 4412 generating a 106-tone dRU over a 20 MHz, 40 MHz, and 80 MHz bandwidth. In such cases, pilot tone indices of the 106-tone dRU over BW20 may include the following: {−111 −78 15 48}, {−56 −23 70 103}. Pilot tone indices of the 106-tone dRU over BW40 may include the following: {−224 −125 28 127}, {−191 −92 61 160}, {−169 −70 83 182}, {−136 −37 116 215}. Pilot tone indices of the 106-tone dRU over BW80 may include the following: {−447 −359 53 141}, {−227 −139 273 361}, {−425 −117 75 383}, {−337 −249 163 251}, {−194 −106 306 394}, {−370 −282 130 218}, {−260 −172 240 328}, {−392 −84 108 416}.

In some implementations, in generating the pilot tones of the dRU based on the hierarchical structure of pilot tones, process 4500 may involve processor 4412 generating a 242-tone dRU over a 40 MHz, and 80 MHz bandwidth. In such cases, pilot tone indices of the 242-tone dRU over BW40 may include the following: {−224 −191 −125 −92 28 61 127 160}, {−169 −136 −70 −37 83 116 182 215}. Pilot tone indices of the 242-tone dRU over BW80 may include the following: {−447 −359 −227 −139 53 141 273 361}, {−425 −337 −249 −117 75 163 251 383}, {−370 −282 −194 −106 130 218 306 394}, {−392 −260 −172 −84 108 240 328 416}.

In some implementations, in generating the pilot tones of the dRU by distributing the subcarriers of the RU based on the hierarchical structure of pilot tones, process 4500 may involve processor 4412 generating a 484-tone dRU over a 80 MHz bandwidth. In such cases, pilot tone indices of the 484-tone dRU over BW80 may include the following: {−447 −425 −359 −337 −249 −227 −139 −117 53 75 141 163 251 273 361 383}, {−392 −370 −282 −260 −194 −172 −106 −84 108 130 218 240 306 328 394 416}.

In some implementations, a distribution of the plurality of pilot tones of the dRU may be symmetric to a DC tone along an axis of subcarrier indices.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
generating a plurality of pilot tones of a distributed-tone resource unit (dRU) based on a hierarchical structure of pilot tones that is used for a regular RU (rRU); and
communicating using the dRU,
wherein the generating of the pilot tones of the dRU based on the hierarchical structure of pilot tones comprises generating a 26-tone dRU and any of a 52-tone dRU or a 106-tone dRU over a 20 MHz bandwidth, a 40 MHz bandwidth and an 80 MHz bandwidth,
wherein pilot tone indices of the 26-tone dRU over the 40 MHz bandwidth comprise {−224 28}, {−125 127}, {−202 50}, {−103 149}, {−81 171}, {−114 138}, {−213 39}, {−92 160}, {−191 61}, {−169 83}, {−70 182}, {−147 105}, {−48 204}, {−180 72}, {−59 193}, {−158 94}, {−37 215}, {−136 116}, and wherein pilot tone indices of the 26-tone dRU over the 80 MHz bandwidth comprise: {−447 53}, {−359 141}, {−403 97}, {−315 185}, {−271 229}, {−227 273}, {−139 361}, {−183 317}, {−95 405}, {−117 383}, {−425 75}, {−73 427}, {−381 119}, {−161 339}, {−337 163}, {−249 251}, {−293 207}, {−205 295}, {−194 306}, {−106 394}, {−150 350}, {−62 438}, {−414 86}, {−370 130}, {−282 218}, {−326 174}, {−238 262}, {−260 240}, {−172 328}, {−216 284}, {−128 372}, {−304 196}, {−84 416}, {−392 108}, {−436 64}, {−348 152}, wherein pilot tone indices of the 52-tone dRU over the 20 MHz bandwidth comprise {−111 −89 15 37}, {−100 −78 26 48}, {−56 −34 70 92}, {−45 −23 81 103}, wherein pilot tone indices of the 52-tone dRU over the 40 MHz bandwidth comprise {−224 −125 28 127}, {−202 −103 50 149}, {−213 −114 39 138}, {−191 −92 61 160}, {−169 −70 83 182}, {−147 −48 105 204}, {−158 −59 94 193}, {−136 −37 116 215}, and wherein pilot tone indices of the 52-tone dRU over the 80 MHz bandwidth comprise {−447 −359 53 141}, {−403 −315 97 185}, {−227 −139 273 361}, {−183 −95 317 405}, {−425 −117 75 383}, {−381 −73 119 427}, {−337 −249 163 251}, {−293 −205 207 295}, {−194 −106 306 394}, {−150 −62 350 438}, {−370 −282 130 218}, {−326 −238 174 262}, {−260 −172 240 328}, {−216 −128 284 372}, {−392 −84 108 416}, {−436 −348 64 152}, wherein pilot tone indices of the 106-tone dRU over the 20 MHz bandwidth comprise {−111 −78 15 48}, {−56 −23 70 103}, wherein pilot tone indices of the 106-tone dRU over the 40 MHz bandwidth comprise {−224 −125 28 127}, {−191 −92 61 160}, {−169 −70 83 182}, {−136 −37 116 215}, and wherein pilot tone indices of the 106-tone dRU over the 80 MHz bandwidth comprise {−447 −359 53 141}, {−227 −139 273 361}, {−425 −117 75 383}, {−337 −249 163 251}, {−194 −106 306 394}, {−370 −282 130 218}, {−260 −172 240 328}, {−392 −84 108 416}, wherein pilot values of dRUs having two pilot tones comprise [1 −1], wherein pilot values of dRUs having four pilot tones comprise [1 1 1 −1], and wherein pilot values of dRUs having eight pilot tones comprise [1 1 1 −1 −1 1 1 1].

2. The method of claim 1, wherein the generating of the pilot tones of the dRU based on the hierarchical structure of pilot tones comprises building a first dRU of a larger size with a first plurality of pilot tones by using a second plurality of pilot tones from two corresponding second dRUs of a smaller size.

3. The method of claim 1, wherein the generating of the pilot tones of the dRU based on the hierarchical structure of pilot tones comprises generating a 52-tone dRU with four pilot tones of the 52-tone dRU comprising respective two pilot tones from each of two corresponding 26-tone dRUs.

4. The method of claim 1, wherein the generating of the pilot tones of the dRU based on the hierarchical structure of pilot tones comprises generating a 106-tone dRU with four pilot tones of the 106-tone dRU comprising respective two pilot tones from each of two corresponding 52-tone dRUs.

5. The method of claim 1, wherein the generating of the pilot tones of the dRU based on the hierarchical structure of pilot tones comprises generating a 242-tone dRU with eight pilot tones of the 242-tone dRU comprising respective four pilot tones from each of two corresponding 106-tone dRUs.

6. The method of claim 1, wherein the generating of the pilot tones of the dRU based on the hierarchical structure of pilot tones comprises generating a 484-tone dRU with sixteen pilot tones of the 484-tone dRU comprising respective eight pilot tones from each of two corresponding 242-tone dRUs.

7. The method of claim 1, wherein a distribution of the pilot tones of the dRU is symmetric to a direct-current (DC) tone along an axis of subcarrier indices.

8. An apparatus, comprising:
a transceiver configured to transmit and receive wirelessly; and
a processor coupled to the transceiver and configured to perform operations comprising:
generating a plurality of pilot tones of a distributed-tone resource unit (dRU) based on a hierarchical structure of pilot tones that is used for a regular RU (rRU); and
communicating, via the transceiver, using the dRU,
wherein, in generating the pilot tones of the dRU based on the hierarchical structure of pilot tones, the processor is configured to generate a 26-tone dRU and any of a 52-tone dRU or a 106-tone dRU over a 20 MHz bandwidth, a 40 MHz bandwidth and an 80 MHz bandwidth, wherein pilot tone indices of the 26-tone dRU over the 40 MHz bandwidth comprise {−224 28}, {−125 127}, {−202 50}, {−103 149}, {−81 171}, {−114 138}, {−213 39}, {−92 160}, {−191 61}, {−169 83}, {−70 182}, {−147 105}, {−48 204}, {−180 72}, {−59 193}, {−158 94}, {−37 215}, {−136 116}, and wherein pilot tone indices of the 26-tone dRU over the 80 MHz bandwidth comprise: {−447 53}, {−359 141}, {−403 97}, {−315 185}, {−271 229}, {−227 273}, {−139 361}, {−183 317}, {−95 405}, {−117 383}, {−425 75}, {−73 427}, {−381 119}, {−161 339}, {−337 163}, {−249 251}, {−293 207}, {−205 295}, {−194 306}, {−106 394}, {−150 350}, {−62 438}, {−414 86}, {−370 130}, {−282 218}, {−326 174}, {−238 262}, {−260 240}, {−172 328}, {−216 284}, {−128 372}, {−304 196}, {−84 416}, {−392 108}, {−436 64}, {−348 152}, wherein pilot tone indices of the 52-tone dRU over the 20 MHz bandwidth comprise {−111 −89 15 37}, {−100 −78 26 48}, {−56 −34 70 92}, {−45 −23 81 103}, wherein pilot tone indices of the 52-tone dRU over the 40 MHz bandwidth comprise {−224 −125 28 127}, {−202 −103 50 149}, {−213 −114 39 138}, {−191 −92 61 160}, {−169 −70 83 182}, {−147 −48 105 204}, {−158 −59 94 193}, {−136 −37 116 215}, and wherein pilot tone indices of the 52-tone dRU over the 80 MHz bandwidth comprise {−447 −359 53 141}, {−403 −315 97 185}, {−227 −139 273 361}, {−183 −95 317 405}, {−425 −117 75 383}, {−381 −73 119 427}, {−337 −249 163 251}, {−293 −205 207 295}, {−194 −106 306 394}, {−150 −62 350 438}, {−370 −282 130 218}, {−326 −238 174 262}, {−260 −172 240 328}, {−216 −128 284 372}, {−392 −84 108 416}, {−436 −348 64 152}, wherein pilot tone indices of the 106-tone dRU over the 20 MHz bandwidth comprise {−111 −78 15 48}, {−56 −23 70 103}, wherein pilot tone indices of the 106-tone dRU over the 40 MHz bandwidth comprise {−224 −125 28 127}, {−191 −92 61 160}, {−169 −70 83 182}, {−136 −37 116 215}, and wherein pilot tone indices of the 106-tone dRU over the 80 MHz bandwidth comprise {−447 −359 53 141}, {−227 −139 273 361}, {−425 −117 75 383}, {−337 −249 163 251}, {−194 −106 306 394}, {−370 −282 130 218}, {−260 −172 240 328}, {−392 −84 108 416}, wherein pilot values of dRUs having two pilot tones comprise [1 −1],
wherein pilot values of dRUs having four pilot tones comprise [1 1 1 −1], and
wherein pilot values of dRUs having eight pilot tones comprise [1 1 1 −1 −1 1 1 1].

9. The apparatus of claim 8, wherein, in generating the pilot tones of the dRU based on the hierarchical structure of pilot tones, the processor is configured to generate a 52-tone dRU with four pilot tones of the 52-tone dRU comprising respective two pilot tones from each of two corresponding 26-tone dRUs.

10. The apparatus of claim 8, wherein, in generating the pilot tones of the dRU based on the hierarchical structure of pilot tones, the processor is configured to generate a 106-tone dRU with four pilot tones of the 106-tone dRU comprising respective two pilot tones from each of two corresponding 52-tone dRUs.

11. The apparatus of claim 8, wherein, in generating the pilot tones of the dRU based on the hierarchical structure of pilot tones, the processor is configured to generate a 242-tone dRU with eight pilot tones of the 242-tone dRU comprising respective four pilot tones from each of two corresponding 106-tone dRUs.

12. The apparatus of claim 8, wherein, in generating the pilot tones of the dRU based on the hierarchical structure of pilot tones, the processor is configured to generate a 484-tone dRU with sixteen pilot tones of the 484-tone dRU comprising respective eight pilot tones from each of two corresponding 242-tone dRUs.

* * * * *